(12) United States Patent
Marumoto

(10) Patent No.: US 8,482,826 B2
(45) Date of Patent: Jul. 9, 2013

(54) IMAGE PROCESSING APPARATUS, PRINTING APPARATUS AND IMAGE PROCESSING METHOD

(75) Inventor: Yoshitomo Marumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 567 days.

(21) Appl. No.: 12/519,576

(22) PCT Filed: Dec. 19, 2007

(86) PCT No.: PCT/JP2007/074461
§ 371 (c)(1),
(2), (4) Date: Jun. 17, 2009

(87) PCT Pub. No.: WO2008/075729
PCT Pub. Date: Jun. 26, 2008

(65) Prior Publication Data
US 2009/0310150 A1 Dec. 17, 2009

(30) Foreign Application Priority Data
Dec. 19, 2006 (JP) .................... 2006-341389

(51) Int. Cl.
*G03F 3/08* (2006.01)

(52) U.S. Cl.
USPC ............ 358/521; 358/1.8; 358/1.9; 358/3.13; 358/518; 347/9; 347/15; 347/41; 347/43

(58) Field of Classification Search
USPC .................. 358/1.18, 1.8, 1.9, 3.26, 521, 518
See application file for complete search history.

(56) References Cited

U.S. PATENT DOCUMENTS

| 5,111,310 A | 5/1992 | Parker et al. |
| 5,594,478 A | 1/1997 | Matsubara et al. |

(Continued)

FOREIGN PATENT DOCUMENTS

| JP | 5-169681 | 7/1993 |
| JP | 05-278232 A | 10/1993 |

(Continued)

OTHER PUBLICATIONS

English Machine Translation of JP 2006-001054-A (Miyazaki, Published Jan. 5, 2006).*

(Continued)

*Primary Examiner* — Benny Q Tieu
*Assistant Examiner* — Juan M Guillermety
(74) *Attorney, Agent, or Firm* — Fitzpatrick, Cella, Harper & Scinto

(57) ABSTRACT

A dither pattern is formed in such a manner that threshold values 1 to 16 are dispersed in regard to the order of magnitudes of the threshold values. First, there is made a calculation of multiplying each value of the image data by a ratio of 1/2. Thereby, there is produced the divided 17-valued data where every value of all pixels is "2". Next, binarization is carried out for the divided data by using the dither pattern. As a result, binary data at the first pass is obtained. Next, there is obtained the data by a product of a ratio (1/2+1/2) obtained by adding 1/2 to the above ratio and each value of the image data. Binarization is carried out for the image data by using the dither pattern. This produces binary data. Finally, dot data for the second pass is obtained by subtracting data from the binary data.

11 Claims, 21 Drawing Sheets

U.S. PATENT DOCUMENTS

| | | |
|---|---|---|
| 7,552,996 B2 | 6/2009 | Ochiai et al. |
| 2006/0193009 A1* | 8/2006 | Kakutani ................. 358/521 |
| 2007/0058204 A1 | 3/2007 | Kakutani |
| 2007/0097164 A1 | 5/2007 | Marumoto |
| 2007/0109604 A1 | 5/2007 | Marumoto |
| 2008/0137146 A1 | 6/2008 | Marumoto |
| 2009/0040550 A1 | 2/2009 | Marumoto et al. |

FOREIGN PATENT DOCUMENTS

| | | |
|---|---|---|
| JP | 2622429 | 6/1997 |
| JP | 2001-298617 | 10/2001 |
| JP | 2002-144539 | 5/2002 |
| JP | 2006-1054 | 1/2006 |
| JP | 2006-50596 | 2/2006 |
| JP | 2006-110958 A | 4/2006 |
| JP | 2007-76246 | 3/2007 |

OTHER PUBLICATIONS

English Machine Translation of JP 2006-110958-A (Yamaguchi, Published Apr. 27, 2006).*

Floyd et al., "An Adaptive Algorithm for Spatial Grey Scale," *SID International Symposium Digest of Technology Papers*, pp. 36-37, 1975.

International Preliminary Report on Patentability and translation in International Application No. PCT/JP2007/074461 dated Jul. 2, 2009.

Office Action dated Jan. 27, 2012, in Japanese Application No. 2008-550176.

* cited by examiner

IMAGE PROCESSING APPARATUS, PRINTING APPARATUS AND IMAGE PROCESSING METHOD

TECHNICAL FIELD

The present invention relates to an image processing apparatus, a printing apparatus and an image processing method, and in particular to generation of image data used for dividedly forming an image to be printed on a printing medium by plural times of scans of a printing head.

BACKGROUND ART

With a prevalence of information processing apparatuses such as a personal computer, a printing apparatus as am image generation terminal is also widely prevalent. In particular, an ink-jet printing apparatus which ejects ink from ejection openings onto the printing medium such as a paper to perform printing has various advantages, such as a non-impact and low noise printing system, a high density and a high speed printing operation, and easy application for color printing. From these points, the ink-jet printing apparatus is becoming a mainstream one in the field of a printing apparatus for personal use.

Such wide use of the ink-jet printing technology has required further improvement in print image quality. Particularly, since there is recently an environment where photos can be printed at home with ease by a print system, a quality of a print image not less degraded than in a silver halide photography has been demanded. In comparison with such sliver halide photography, a granular feeling in a print image is one of the conventional problems. On the other hand, various configurations of the print system for reducing the granular feeling are proposed.

For example, there is known an ink-jet printing apparatus using normal ink of cyan, magenta, yellow and black and further, ink of light cyan and light magenta which are lower in concentration of a color material such as dyestuff than the normal ink. Such an apparatus reduces a granular feeling by using ink of light cyan and light magenta in an area where the print density is low. In addition, in an area of high density, use of ink of cyan and magenta having a normal density realizes a wider color reproduction range and smooth gradation sequence properties.

Also, there is known a method of designing a size of a dot formed in the printing medium to be made small for reducing a granular feeling. For realizing this, there has been advancing the technology of reducing an amount of an ink droplet ejected from an ejection opening of the printing head. In this case, in addition to making an amount of an ink droplet be small, arranging many ejection openings in high density causes a high resolution image to be simultaneously obtained without impairing printing speeds.

Besides the aforementioned granular feeling reducing technology of focusing attention on the ink to be used, the technology of focusing attention on an area coverage modulation method is known as that of reducing a granular feeling by means of image processing. An ink-jet printing apparatus determines execution/non-execution of dot formation to each pixel and carries out printing according to the determination. In this processing, the multi-valued image data having density information is subjected to a quantization process to be finally converted into binary data, that is, data for determining execution/non-execution of dot formation. The print image of an area having the extent which is macroscopically observed, the density or the gradation is expressed by the number and the arrangement of printed dots. Such expression of density or gradation is generally called as an area coverage modulation method. The area coverage modulation method includes various dot arrangements for expressing the same density. For example, there is known a dot arrangement according to an error diffusion method as described in a paper by R. Floid and L. Steinberg: "Adaptive Algorithm for Spatial Grey Scale", SDI Int'l. Sym. Digest of Tech. Papers, paragraphs 36 to 37 (1975). In addition, as a method other than the error diffusion method, there is known a dot arrangement by an ordered dither method as disclosed in Japanese Patent No. 2622429 or Japanese Patent Laid-Open No. 2001-298617. These methods can create an image having a good visual perception in which an arrangement of formed dots is excellent in dispersion properties and low frequency components in a spatial frequency of the dot arrangement is few. In this manner, when dot data (binary data) is obtained using an error diffusion method or a dither method, a binarization process in which print quality is considered is performed.

A so-called serial type of the ink-jet printing apparatus widely employs a multi pass method. It should be noted that words "pass" and "scan" used hereinafter have the same meaning. In the multi pass printing, the dot data for a certain area which is obtained as described above is divided into data for each ink color and each pass and the division is performed generally by using masks.

FIG. 1 is a diagram for explaining the multi pass printing and schematically shows a printing head and dot patterns printed in a case of completing an image by four times of scans. In FIG. 1, P0001 denotes a printing head. Here, for simplifying its illustration and explanation, the printing head having sixteen ejection openings (hereinafter, also referred to as nozzle) is shown. The nozzle array is, as shown in FIG. 1, divided into four groups of a first to a fourth group, each including four nozzles for use. P0002 denotes a mask pattern where pixels of a mask which permits printing (print permitting pixel) corresponding to each nozzle are painted in black. The mask patterns corresponding to four nozzle groups are complementary with each other. When the four mask patterns are overlapped, all the pixels of 4×4 constitute the print permitting pixels. That is, four mask patterns is used to complete printing in all the areas of 4×4.

P0003 to P0006 denote arrangement patterns of formed dots and show the process in which an image is completed by executing plural times of printing scans. As shown in this pattern, in a multi pass printing, each printing scan forms dots based upon binary image data (dot data) generated with use of the mask patterns corresponding to nozzle groups respectively. In addition, each time the printing scan is completed, a printing medium is conveyed in an arrow direction by the width amount of one nozzle group. In this way, for areas corresponding to the width of respective nozzle groups in the printing medium, images of respective areas are completed by four times of printing scans.

According to the multi pass printing as described above, density unevenness due to a variation in an ejection direction or an amount of ink between plural nozzles possibly generated in the manufacturing process of a print head or to an error in paper conveying that is performed between printing scans can be hard to be observed.

It should be noted that in FIG. 1, the four-pass printing in which scanning the same image area is executed four times is shown, but the multi pass printing is not limited to this four-pass printing. A two-pass printing in which an image is completed by twice of printing scans, a three-pass printing in which an image is completed by three times of printing scans, or a five or more-pass printing in which an image is completed by five or more times of printing scans may be applied.

In the multi pass printing, a number of printed dots in each printing scan can be adjusted or an operation frequency of a nozzle for which a trouble is easy to occur can be reduced, by changing an arrangement of a print permitting pixel in a mask pattern. That is, the multi pass printing can have modes in accordance with various purposes other than elimination of the above described density unevenness or bandings.

As described above, according to the recent ink-jet printing system, it is possible to output a stable image with a high quality at a high speed by wide variety of ink, implementation of various multi pass printings, adoption of a preferable area coverage modulation method (binarization method) and the like.

However, a configuration where the dot data obtained in the binarization of a dither method is made to be a data for each scan of the multi-pass printing by using the mask pattern may cause a problem related to a memory capacity or processing. More specifically, there are required two kinds of pattern data composed of a dither pattern used for binarization and a mask pattern used for dividing the dot data into a data for each scan. In this case, the capacity of the memory for storing this pattern data may increase. Also, two processes of the binarization using the dither pattern and data division using the mask pattern are performed and then a processing load may increase.

Patent reference 1: Japanese Patent No. 2622429
Patent reference 2: Japanese Patent Laid-Open No. 2001-298617
Patent reference 3: Japanese Patent Laid-Open No. 2006-050596
Non-patent reference 1: "Adaptive Algorithm for Spatial Grey Scale", SDI Int'l. Sym. Digest of Tech. Papers, No. page 36-37, 1975

DISCLOSURE OF THE INVENTION

An object of the present invention is to provide an image processing apparatus, a printing apparatus and an image processing method which can generate dot data of divided images with small memory amount for storing pattern data and low processing load.

To accomplish the above object, the present invention is featured in an image processing apparatus that, for completing an image to be printed on a unit area of a printing medium by performing a plurality times of printing operation with use of a printing head, generates dot data corresponding to divided images which are to be printed by the plurality times of printing operation respectively, said apparatus comprising: an image processing unit for generating the dot data corresponding to the divided images by using a dither pattern, based on multi-valued image data representing the image to be printed on the unit area, wherein said image processing unit generates the dot data corresponding to the divided images so that the respective divided images are printed on different positions of the unit area from one another.

Preferably, the image processing unit including: a dividing unit for dividing the multi-valued image data corresponding to the image to be printed on the unit area, according to different division ratios (for example, 1/2 and 2/2 shown in FIG. 13, 1/4, 2/4, 3/4 and 4/ shown in FIG. 14, 1/2 and 2/2 shown in FIG. 21) corresponding to the plurality times of printing operation respectively; and a generating unit for binarizing respective divided multi-valued image data obtained by divisions according to the different division ratios, and generating dot data (for example, dot data B and C shown in FIG. 13, dot data A, C, E and G shown in FIG. 14, A1 and A2 shown in FIG. 21) corresponding to the divided images based on a result of the binarization.

Further, preferably, the generating unit binarizes respective divided multi-valued image data obtained by divisions according to the different division ratios to generate a plurality of dot data (for example, dot data A and B shown in FIG. 13, dot data A, B, D and F shown in FIG. 14), and generates dot data (for example, dot data B and C shown in FIG. 13, dot data A, C, E and G shown in FIG. 14) corresponding to the divided images based on the plurality of dot data.

Further, preferably, the generating unit subtracts from one dot data (for example, dot data A shown in FIG. 13, dot data D shown in FIG. 14) obtained by binarizing divided multi-valued image data obtained by the division according to one division ratio (for example, 2/2 shown in FIG. 13, 3/4 shown in FIG. 14) of the different division ratios, another dot data (for example, dot data B shown in FIG. 13, dot data B shown in FIG. 14) obtained by binarizing divided multi-valued image data obtained by the division according to another division ratio (for example, 1/2 shown in FIG. 13, 2/4 shown in FIG. 14) of the different division ratios, to generate the dot data (for example, dot data C shown in FIG. 13, dot data C shown in FIG. 14) corresponding to the divided image to be printed by the printing operation corresponding to the one division ratio.

Further, preferably, the generating unit binarizes the divided multi-valued image data (for example, D1 shown in FIG. 21) obtained by the division according to one division ratio (for example, 1/2 shown in FIG. 21) of the different division ratios to generate the dot data (for example, dot data A1 shown in FIG. 21) corresponding to one divided image, and generates the dot data (for example, dot data A2 shown in FIG. 21) corresponding to another divided image by binarizing divided the multi-valued image data (for example, D2 shown in FIG. 21) obtained by the division according to another division ratio (for example, 2/2 shown in FIG. 21) of the different division ratios, based on the dot data (for example, dot data A1 shown in FIG. 21) corresponding to the one divided image.

Further, preferably, the image processing unit generates the dot data corresponding to the divided image by simultaneously performing processing of dividing the multi-valued image to be printed on the unit area into respective image data corresponding to the plurality times of printing operation respectively and processing of binarizing the multi-valued image data, with use of the dither pattern.

Further, the present invention is featured in an image processing apparatus that generates dot data of divided images to be printed in each of a plurality times of printing operation for completing a image, said apparatus comprising: a dividing unit that respectively divides data of the image to be completed at a first division ratio and a second division ratio, said first division ratio being obtained by adding a plurality of printing ratios, which are included in a plurality of printing ratios at which the image to be completed is divided into a plurality of divided images respectively and respectively correspond to a plurality of divided images printing order of which are consecutive, and said second division ratio being obtained by adding one less number of printing ratios than said first printing ratio, to obtain a first divided data and a second divided data respectively; a binarization unit for binarizing the first divided data and the second divided data by using the dither pattern to obtain a first dot data and a second dot data respectively; and a generating unit for generating dot data of the divided image to be printed in one of the plurality times of printing operation by subtracting the second dot data from the first dot data.

Further, the present invention is featured in an image processing method that, for completing an image to be printed on a unit area of a printing medium by performing a plurality times of printing operation with use of a printing head, generates dot data corresponding to divided images which are to be printed by the plurality times of printing operation respectively, said method comprising: an image processing step of generating the dot data corresponding to the divided images by using a dither pattern, based on multi-valued image data representing the image to be printed on the unit area, wherein said image processing step generates the dot data corresponding to the divided images so that the respective divided images are printed on different positions of the unit area from one another.

Further, in other aspect of the present invention, a computer program causing a computer to execute the above described image processing method is provided.

According to the above construction, dot data can be generated with small memory amount for storing pattern data and low processing load.

BRIEF DESCRIPTION OF THE DRAWINGS

FIG. 1 is a diagram schematically showing a multi-pass printing with use of a print head, a dot pattern printed or the like;

BEST MODE FOR CARRYING OUT THE INVENTION

Hereinafter, embodiments of the present invention will be in detail explained with reference to the drawings.

(First Embodiment)

An embodiment of the present invention relates to a mode where ejections of respective inks of cyan (C), magenta (M) and yellow (Y) which are used in an ink-jet printing apparatus are dividedly carried out in two scans for performing printing. In this case, binary data (hereinafter, also referred to as "dot data" or "ejection data") for driving the print head of each of C, M and Y inks correspondingly to printing operations of divided two scans exists. In the present specification, collection of the image data (binary data or the multi-valued data) distinguished by colors of inks and scans is called as "plane".

Figure 2:
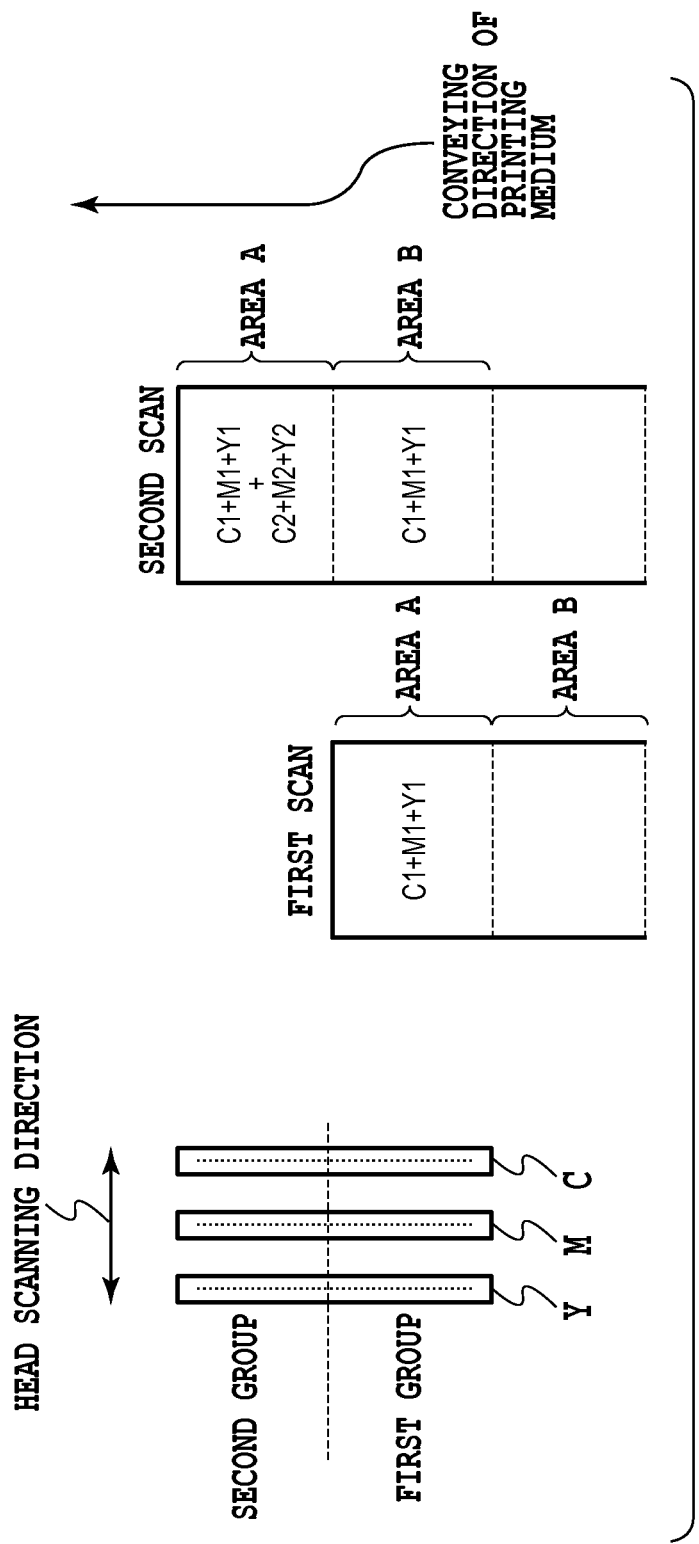
FIG. 2 is a diagram showing a relation between a print head and a printing medium in a case of carrying out a two-pass printing.

FIG. 2 is a diagram schematically showing a relation between a printing head and a printing medium in a two-pass printing executed in a printer. As explained below, in a case of a two-pass printing, an image to be printed in a predetermined unit area of the printing medium is completed by two times of scan of the printing head.

The nozzle group of each color of cyan, magenta and yellow is divided into two groups of a first group and a second group and each group includes 256 nozzles. Accordingly, the total nozzle number of each color is constituted of 512 nozzles.

Scanning operation with the nozzle group of each color is executed to the printing medium in a direction substantially perpendicular to the nozzle arrangement direction (head scanning direction shown in an arrow in the figure) and during the scanning the first and second nozzle groups eject ink onto respective unit areas in the printing medium, each corresponding to an arrangement width of each nozzle group. In this example, ejections of C, M and Y inks are carried out to each unit area based on the binary image data of C, M and Y. In addition, each time one time of scanning terminates, the printing medium is conveyed in the direction perpendicular to the scanning direction ("printing medium conveying direction" shown in an arrow in the figure) by the width amount of one group (here, amount of 256 pixels which is the same as the width of the unit area). In consequence, an image in each unit area is completed by twice of the scans.

Specifically, at the first scan, to area A on the printing medium, the printing is carried out in the order of C, M and Y by using the first group of C nozzle group, the first group of M nozzle group and the first group of Y nozzle group. Next, at the second scan, to area A where the printing in the first scan has terminated, the remaining printing is carried out in the order of Y, M and C by using the second group of C nozzle group, the second group of M nozzle group and the second group of Y nozzle group. Along with this, to area B of the unprinted state, the printing is carried out in the order of Y, M and C by using the first group of C nozzle group, the first group of M nozzle group and the first group of Y nozzle group. Further, by continuation of such operation, the printing is carried out in the order of C1, M1, Y1, Y2, M2 and C2 or Y1, M1, C1, C2, M2 and Y2 to each unit area (area A and area B).

Figure 3:
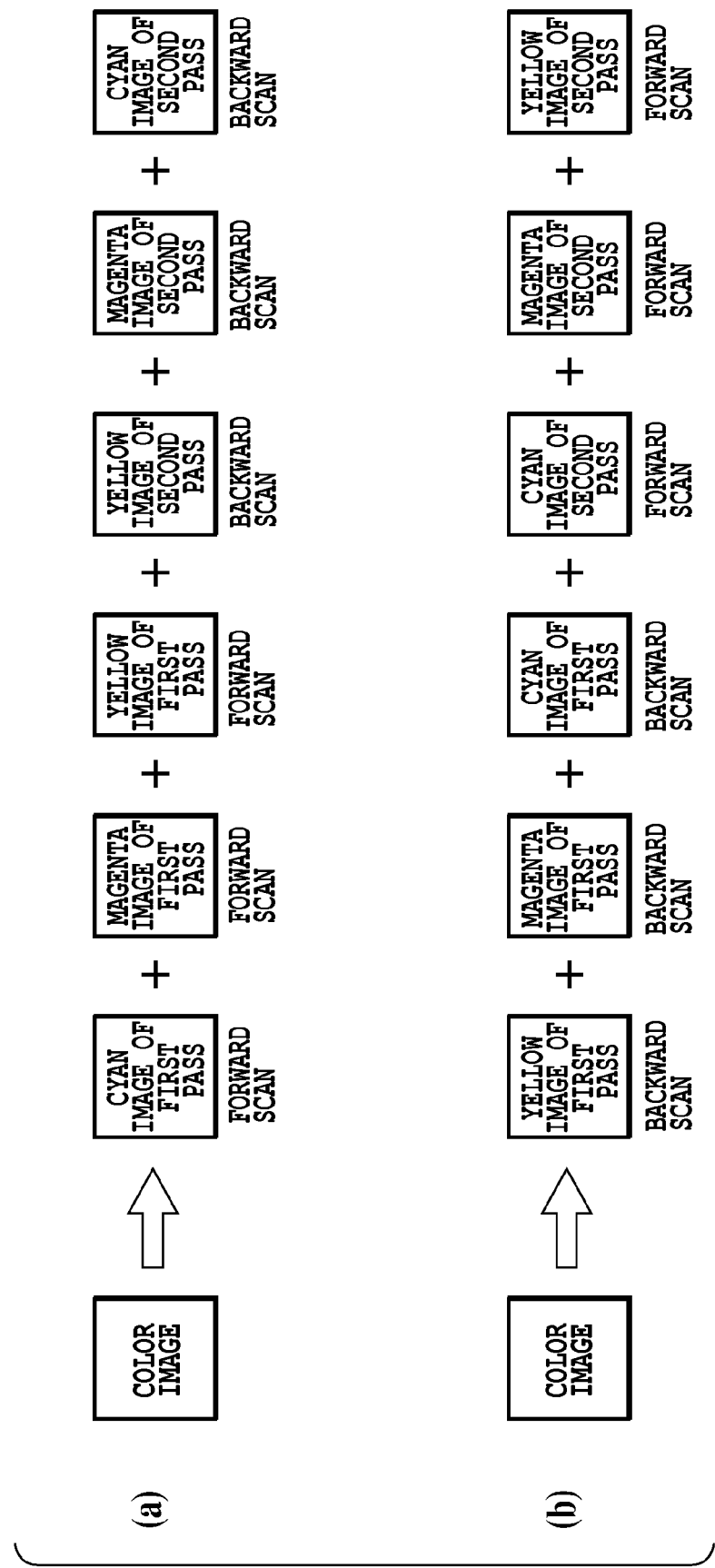
FIG. 3 relates to an embodiment of the present invention and includes diagrams for explaining a case of carrying out a multi-pass printing of two passes by using ink of C, M and Y.

FIG. 3 is diagram for explaining the print order to a unit area in a case of carrying out a multi pass printing of two-passes by using ink of C, M and Y, as shown in FIG. 2.

FIG. 3(a) shows conditions where an image on an area (area A in FIG. 2) which is printed in a forward and backward scans is completed. In the forward scan (first pass) as the first scan, at first, a cyan image is printed based on dot data of cyan generated by data (pass) division/binarization processing to be described later in FIG. 5. Subsequently, at the same scan, likewise a magenta image and a yellow image are printed based on dot data generated by the data (pass) division/binarization processing. That is, the magenta image is put over the cyan image printed before the magenta image, and the yellow image is put over the cyan and magenta images printed before the yellow image. In this way, the images are printed in order. At the backward scan (second pass) as the second scan after a predetermined amount of conveying print medium, likewise, based on dot data of yellow, magenta and cyan generated in order by the data division/binarization to be described later, images thereof are printed in order by putting one image over the other image printed before the one image.

On the other hand, FIG. 3(b) shows conditions where an image on an area (area B in FIG. 2) which is printed in a forward and backward scans is completed. In the backward scan (first pass) as the first scan, at first, a yellow image is printed based on dot data of yellow generated by data (pass) division/binarization processing to be similarly described later. Subsequently, at the same scan, likewise a magenta image and a cyan image are printed based on dot data generated by the data (pass) division/binarization processing to be similarly described later. That is, the magenta image is put over the yellow image printed before the magenta image, and the cyan image is put over the yellow and magenta images printed before the cyan image. In this way, the images are printed in order. At the backward scan (second pass) as the second scan after the predetermined amount of conveying print medium, likewise, based on dot data of cyan, magenta and yellow generated in order, images thereof are printed in order by putting one image over the other image printed before the one image.

In the present embodiment, binary data distinguished by the three-color ink of C, M and Y are generated by using a dither pattern and data generation (pass division) for each scan is carried out in a series of the processes using the dither pattern. More specifically, the data of 8-bit 256 values for each of C, M and Y is converted into the data of 5-bit 17 values. Then, the binarization is carried out for the data obtained by multiplying this data of 17 values by 1/2 based on 2 as the number of the scan times of the two-pass printing by using the dither pattern and this binary data is set as the dot data for the first pass. Also, similarly the data obtained by subtracting the data of the first pass from the dot data obtained by binarizing the data (previous data) having value, which is obtained by multiplying the data of the 17-value by 2/2, by using the dither pattern is set as the dot data for the second pass.

Thereby, since the dot data generation in the six planes is carried out without using mask patterns, a memory area for storing the pattern data can be reduced to prevent an increase of the memory size.

The dither pattern in the present embodiment uses the pattern described in Japanese Patent Laid-Open No. 2006-050596 filed by the present applicant. This is the dither pattern where the arrangement of threshold values in the pattern used for each color are dispersed within each pattern and also the arrangements of the threshold values are dispersed between the mutual patterns for respective colors. This allows the respective dot data for the six planes obtained by the pass division/binarization processing according to the present embodiment to be mutually dispersed. In consequence, an uneven arrangement of the dots in an intermediate image produced by overlapping some planes is restricted as much as possible, thus efficiently reducing the grain and the beading described above.

For example, binary data of. the respective planes is generated so as to have deviation of dots as little as possible in respective dot distributions on the superposed planes of "the first pass C+the first pass M", "the first pass C+the first pass M+the first pass Y", "the first pass C+the first pass M+the first pass Y+the second pass Y", "the first pass C+the first pass M+the first pass Y+the second pass Y+the second pass M", "the first pass C+the first pass M+the first pass Y+the second pass Y+the second pass M+the second pass C", which are obtained by the superposition in an order of the first pass C, the first pass M, the first pass Y, the second pass Y, the second pass M, and the second pass C, which is the ejection order of the printing head in each of scans (hereinafter referred to as pass) by which printing is performed in the order shown in FIG. 3(a). In particular, binary data generation is performed so that not only the dispersibility of the final superposition of "the first pass C+the first pass M+the first pass Y+the second pass Y+the second pass M+the second pass C" but also dot distributions of the intermediate superposition of planes ("intermediate image") have deviation of dots as little as possible.

Further, the above-mentioned fact is also true for an area printed in the order in FIG. 3(b). That is, data generation can be made so that the distribution of the dots in the similar intermediate image obtained in case of superimposing Y of a first pass, M of the first pass, C of the first pass, C of a second pass, M of the second pass and Y of the second pass in that order is not deviated. In the following explanation, the area in FIG. 3(a) will be in detail explained and the area in FIG. 3(b) differs only in the ejection order of ink from the area in FIG. 3(a) and the similar processing may be executed along the ejection order in the area of FIG. 3(b). In addition, the number of the pixels in the plane for the processing in the present embodiment is equivalent to 128 pixels (nozzle arrangement direction)×the number of the pixels corresponding to a printing width (primary scanning direction)

In a case of using a four-color ink further including black (Bk) or even in a case of addition of light ink having a low concentration or specific color ink of red, blue or green, it is apparent from the following description that the present invention can be likewise applied.

Figure 4:
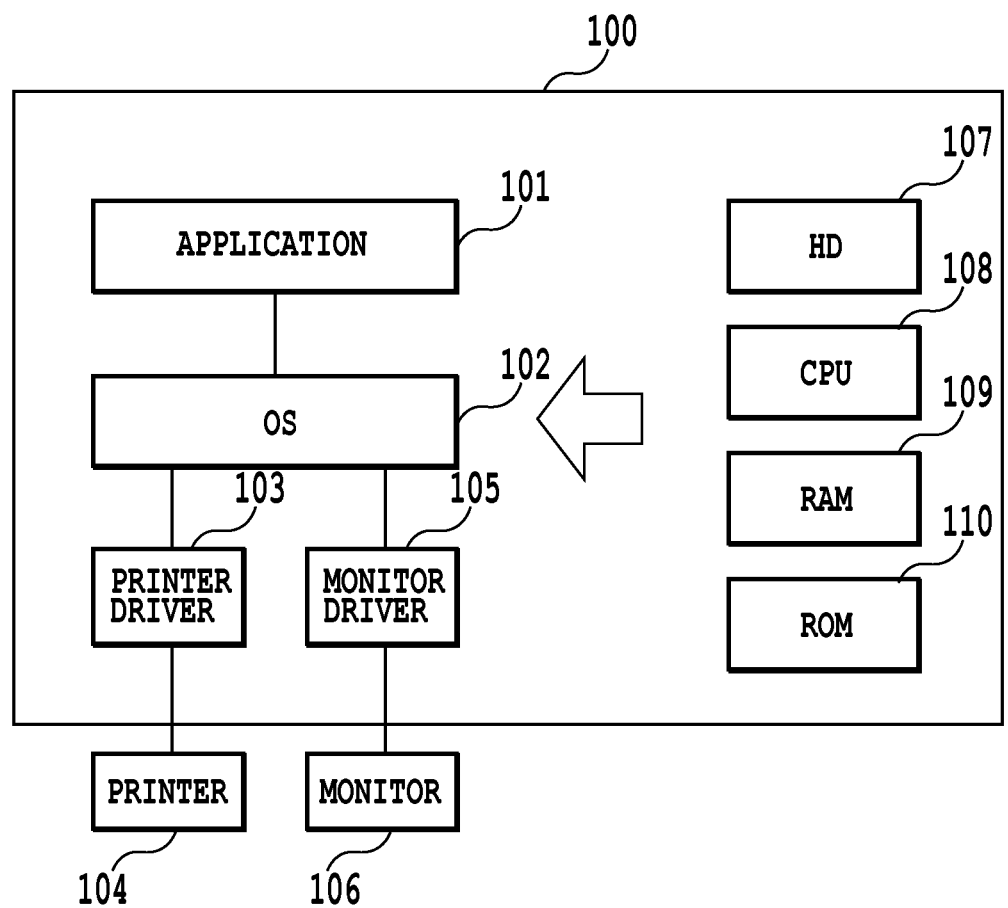
FIG. 4 is a block diagram showing mainly the construction of hardware and software in a personal computer as an image processing apparatus in a first embodiment of the present invention.

FIG. 4 is a block diagram showing mainly the configuration of hardware and software in a personal computer (hereinafter, simply referred to as PC) as an image processing apparatus (image data generating apparatus) according to a first embodiment of the present invention.

In FIG. 4, PC 100 as a host computer operates each software of application software 101, a printer driver 103 and a monitor driver 105 through an operating system (OS) 102. The application software 101 executes the processing in regard to a word processor, a tabular calculation, an internet browser and the like. The monitor driver 104 executes processing of composing image data displayed on a monitor 106 or the like.

The printer driver 103 processes image data or the like issued from the application software 101 to OS 102 to generate binary ejection data finally used in the printer 104. More specifically, by executing image processing to be described later in FIG. 5, binary image data of C, M and Y used in the printer 104 are generated based on the multi-valued image data of C, M and Y. The binary image data thus generated are transferred to the printer 104.

The host computer 100 is provided with CPU 108, a hard disc drive (HD) 107, RAM 109, ROM 10 and the like as various hardware for operating the aforementioned software. That is, CPU 108 executes the processing according to the above soft programs stored in the hard disc 107 and ROM 110, and RAM 109 is used as a work area at the time of the processing execution.

The printer 104 in the present embodiment is a printer of a so-called serial type in which scanning operation with a printing head for ejecting ink is performed to a printing medium and the printing is carried out by ejecting ink during the scanning operation, as described in FIG. 2. A printing head having each ejection opening group corresponding to each ink of C, M and Y is mounted in a carriage and thereby, the scanning operation can be performed to the printing medium such as a print sheet or the like. A printing element such as an electro-thermal converting element or a piezoelectric element is provided in a flow passage communicated with ejection opening of the printing head and the ink is ejected from the ejection opening by driving the printing element. The arrangement density of the ejection openings is 2400 dpi and ink of 3.0 pico-liter is ejected form each ejection opening. The number of the ejection openings in the ejection group of each color is 512.

The printer 104 is provided with CPU, a memory and the like (not shown). The binary image data transferred from the host computer 100 are stored in the memory of the printer 104. In addition, the binary image data stored in the memory are read out under control of CPU of the printer 104 and are sent to a drive circuit of the printing head. The drive circuit drives the printing elements of the printing head based on the sent binary image data, thus ejecting the ink from the ejection openings.

The printing system in the present embodiment is, as described in FIG. 2, a multi pass system of a so-called two-pass which sequentially completes printing for a predetermined area on the printing medium by two times of scan. In this two-pass printing, the binary image data for ejecting ink from each ejection opening in each scan is generated by the image processing described later in FIG. 5. Thereby, as described in FIG. 3(a), the unevenness in the dot distribution in each superposition of planes obtained by superimposing C of a first pass, M of the first pass, Y of the first pass, Y of a second pass, M of the second pass and C of the second pass in that order can be made to be small.

Figure 5:
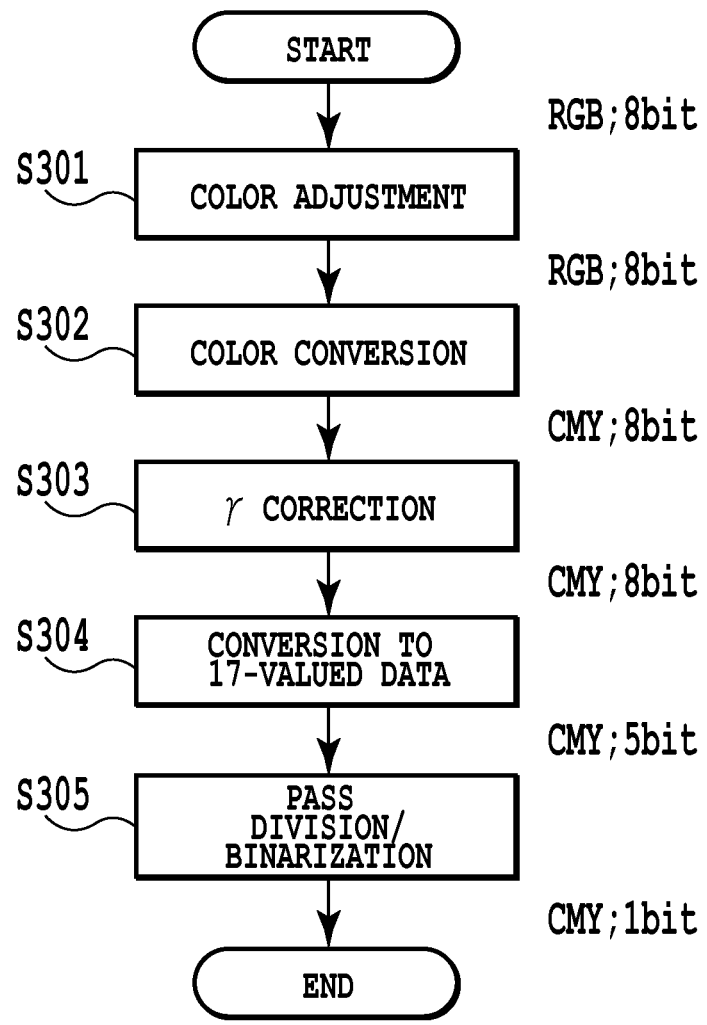
FIG. 5 is a flowchart showing the process order of an image processing apparatus in the first embodiment of the present invention.
Figure 6:
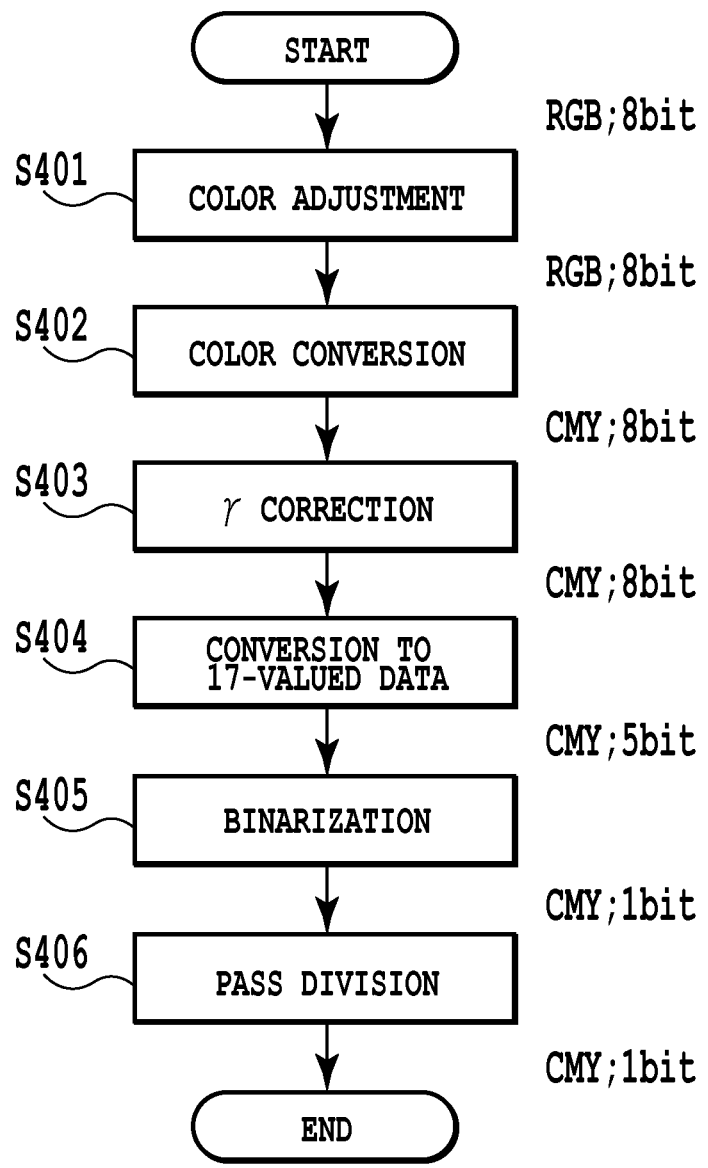
FIG. 6 is a flowchart showing the conventional image processing shown for comparison with the processing in FIG. 5.

FIG. 5 is a flow chart showing the processes of an image processing according to a first embodiment of the present invention. FIG. 6 is a flow chart showing the conventional image processing including binarization using a dither pattern and a pass division using a mask pattern, shown for comparison. Hereinafter, among the image processing, in particular, image processing for image data generation process for each plane according to the present embodiment will be explained while comparing with the conventional image processing.

First at step S301 and at step S401, color adjustment processing such as an input γ correction is executed for R, G and B data of the image obtained from an application or the like. Next, at step S302 and at step S402, for image data of R, G and B, a conversion from a color gamut of R, G and B into a color gamut of color components C, M and Y of inks used in a printer is carried out and also a generation of the color component data C, M and Y for expressing the color in the color gamut obtained by the conversion is carried out. These processes are executed usually by using a look-up table in combination with an interpolation calculation. The processing of this step converts the image data of 8 bits for each of R, G and B into the image data of 8 bits for each of C, M and Y (multi-valued image data). Next, at step S303 and step S403, an output γ correction is made to adjust input/output gradation characteristics of the printing head used in the printer 104. Next, at step S304 and step S404 respectively, a conversion process to 17-valued data is executed to obtain multi-valued image data of 17-values. The conversion process to 17-valued data may be executed, for example, by a pseudo-gradation sequence process such as an error diffusion process.

Figure 1:
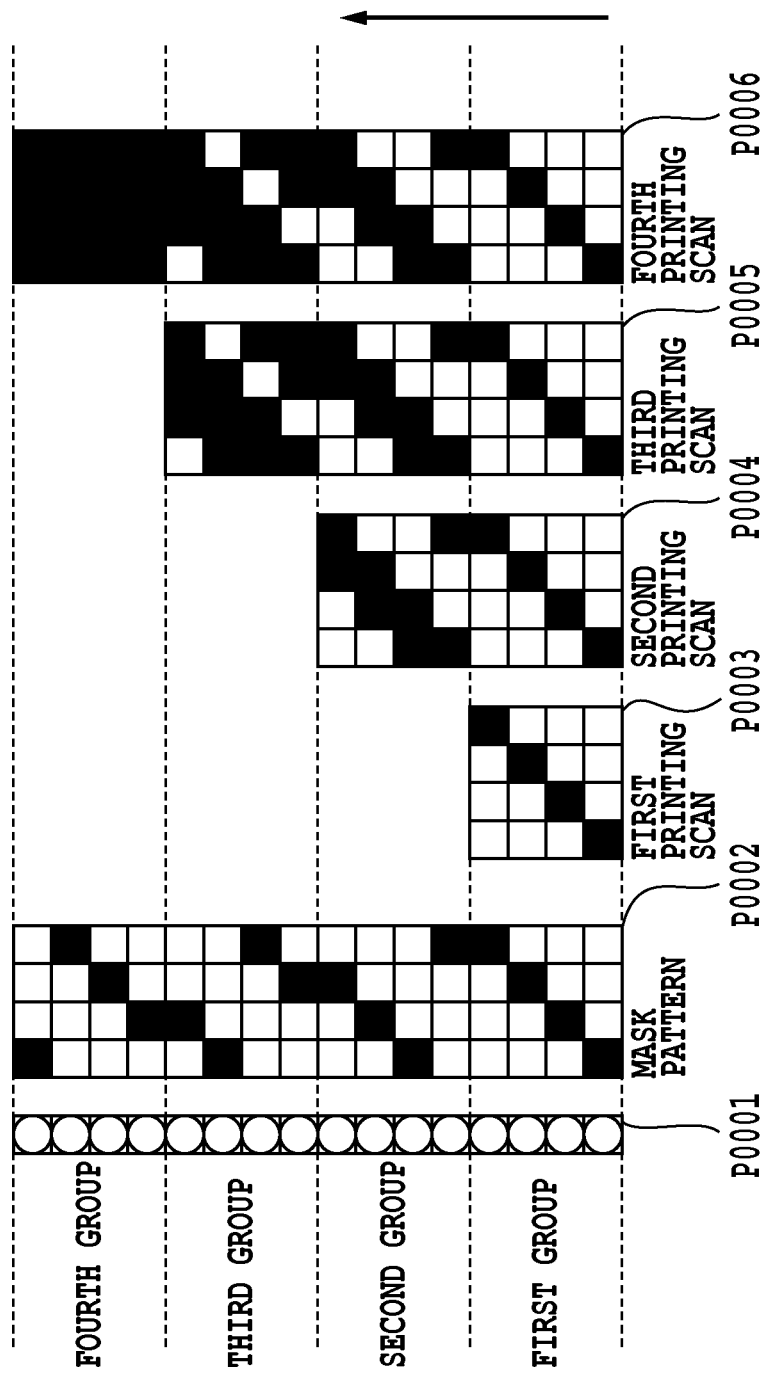

Next, in the conventional example shown FIG. 6, at step S405, a dither pattern is used for each of the 17-valued image data of C, M and Y to carry out the binarization, thus obtaining the binary data. The pass division is carried out for the obtained binary image data to obtain binary data used for each printing of the two passes. This pass division is carried out by using the mask pattern aforementioned in FIG. 1. This case, as described above, possibly causes pattern interference between the mask pattern and the binary image pattern. In addition, in these mask patterns, good dispersing properties are not considered particularly for the mutual dot arrangements between a total of the six planes corresponding to the two-pass of C, M and Y generated by these mask patterns. In consequence, there possibly occurs the problem of grain as described later referring to (a) to (d) of FIG. 8.

In contrast, in the present embodiment, at step S305 the pass division and the binarization are simultaneously performed for each of the 17-valued image data of C, M and Y. This processing is carried out by using dither patterns, and the present embodiment uses dither patterns produced for each ink color by a method disclosed in Japanese Patent Laid-Open No. 2006-050596. The respective dither patterns have the arrangements of the threshold values in which the threshold values are dispersed in relation to the order of magnitudes of the threshold values. In addition, the respective dither patterns have the arrangements of the threshold values in which the threshold values are dispersed in relation to the order of magnitudes of the threshold values also between ink colors. This "dispersing" means, in relation to frequency components of the arrangement of the above threshold values, that power spectra of low frequency components (for example, a half of the range of the frequency components or less) are smaller than that of high frequency components.

In this way, not only the binarization but also the pass division is carried out by using the dither pattern in which the arrangements of the threshold values are dispersed. Thereby, as described below, arrangements of dots formed in each pass are dispersed at each pass and arrangements of dots formed in passes are also between passes. Further, the dot arrangements are dispersed even between passes having different ink colors. As a result, the uneven arrangement of the dots formed in the middle of printing is eliminated, making it possible to reduce the grain or the beading. It should be noted that this "dispersing" means, in relation to frequency components of the arrangement of the threshold values, that power spectra of low frequency components are smaller than that of high frequency components.

Figure 7:
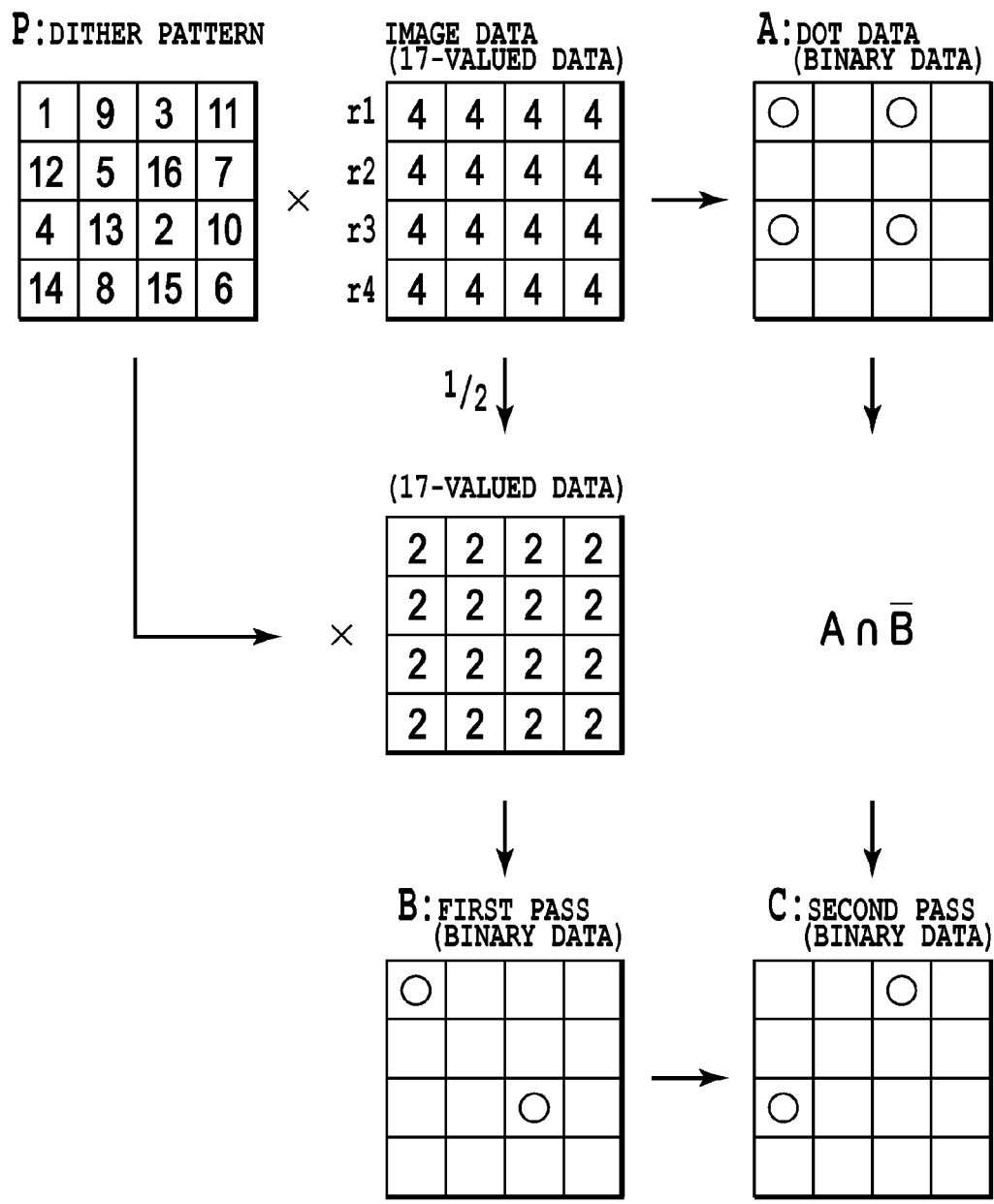
FIG. 7 is a diagram for explaining a detail of the processing in the first embodiment of the present invention in regard to the pass division and the binarization processing shown in FIG. 5.

FIG. 7 is a diagram schematically showing the pass division/binarization processing at step S305 in FIG. 5. FIG. 7 expresses a dither pattern of a dimension of 128 pixels×128 pixels corresponding to the 128 nozzles in a unit area width of the two-pass print shown in FIG. 2 and planes of data processed by using the dither pattern, in patterns of 4 pixels×4 pixels for simplification of the explanation and the illustration.

In FIG. 7, the dither pattern P is a dither pattern for a single color of cyan (C) generated by a method disclosed in Japanese Patent Laid-Open No. 2006-050596. As shown in FIG. 7, the threshold values 1 to 16 are arranged to be dispersed in relation to the order of magnitudes. An image data of the 17-valued shows a so-called solid image where, as one example, every value of all pixels is "4".

In the pass division/binarization processing for the two-pass in the present embodiment, first, there is executed the process of dividing each value of the image data by the pass number of 2. Specifically, when this number of 2 is set as a denominator, firstly this processing executes a calculation of multiplying each value of the image data by a ratio of 1/2 as a numerator of 1. In this way, for obtaining the dot data of the first pass, here the division ratio of the image data is set as 1/2 which is the same as the above ratio. This calculation produces the divided 17-valued data where every value of all pixels is "2".

Next, binarization is executed for the divided data, by using the dither pattern P. This produces binary (dot) data B for the first pass. As shown in FIG. 7, the dot data B shows the data where "1" (circle sign) is arranged at each of the pixels corresponding to the threshold values of "1" and "2".

Next, there is produced the data of a product of a division ratio obtained by a ratio (1/2+1/2) by adding 1/2 to the above ratio and each value of the image data. That is, a calculation of multiplying a value of each pixel of the image data by 2/2 is performed. For obtaining the dot data at the second pass thus, here the division ratio of the image data is set as "2/2" obtained by adding the above ratio. The reason for it is that dot arrangements by the image data multiplied by 1/2 in the dot data generation at the first pass are accumulated, which is reflected in dot arrangements at the next second pass. In other words, there is reflected a state where the dots are already arranged at the first pass to the pixels corresponding to the threshold values of "1" and "2" in the dither pattern P. It should be noted that since the division ratio is 2/2 in a case of the two-pass like the present example, the data obtained by multiplying of this division ratio becomes original image data. Therefore, an algorithm where a calculation of obtaining a product of the division ratio is not performed may be used. Then, the binarization is carried out for the original image data by using the dither pattern P, thus obtaining binary (dot) data A. Finally dot data C for the second pass are obtained by subtracting data B from data A. Specifically, a logical product of data A and a negative of data B is obtained between the corresponding pixels. The pass division and binarization processing to which the dither pattern as described above is applied is repeated until the dot data of one plane of "the number of pixels corresponding to the print width (primary scanning direction)×128 pixels (nozzle arrangement direction)" is obtained.

As described above, according to the present embodiment, multi-valued image data is divided according to different division ratios corresponding to respective passes (respective printing operations), each of divided multi-valued image data is binarized using same dither pattern, and dot data for each pass is generated based on a result of binarization. In this dot generation, the dot data of each pass is generated so that dots are arranged to different positions in each pass.

It should be noted that, as is seen apparently from the above explanation, the "ratio" corresponds to a printing ratio of each image divided finally. In addition, in the above description, it is explained that the first-pass data and the second-pass data are successively obtained in this order, but this order is made for explanatory convenience and the process order is not limited thereto. The process of multiplying an image data by a division ratio of 1/2 may be first executed or the process of multiplying an image data by a division ratio of 2/2 may be first executed. In addition, the binarization process using the dither pattern for the result of multiplying of the division ratio may be executed in any order. Further, the processing of finally obtaining a dot data for each pass by subtraction between two data in regard to the dot data as a result of the binarization may be executed in any order. This is the same in embodiments to be explained below.

As described above, according to the present embodiment, only by using the dither pattern, divided data for each pass is obtained and also the binarization can be carried out. As a result, both of the dither pattern for binarization and the mask pattern for pass division are conventionally required, but only the dither pattern may be used, thereby making it possible to prevent an increase of a memory amount for storing the pattern data. In addition, processes for finally obtaining result of binarization are performed as simultaneous processes of the binarization and the pass division to reduce a processing load of CPU.

Further, the threshold values of the dither pattern are dispersed in relation to the order of magnitudes of threshold values. Therefore, the result of the dither processing for the divided 17-valued data obtained by multiplying of each division ratio by using this pattern becomes dot data which is dispersed according to dispersion in relation to the order of the magnitudes. As a result, dot data B and dot data C at the first pass and the second pass finally obtained are arranged to be dispersed at the plane of each pass and also even between the respective dot data of two passes. In addition, since the dither pattern for each ink color has, as described in Japanese Patent Laid-Open No. 2006-050596, the threshold value arrangements dispersed between ink colors, the dot arrangements of each pass finally obtained are dispersed even between the ink colors. As a result, the problem of so-called grain can be prevented from being caused. Description of such grain will be given in detail below.

In a case where the mutual relation in the respective contents between the dither pattern and the mask pattern is not considered in a system that performs binarization using a dither pattern and performs a pass division for the binary data using a mask pattern, there may occur a problem of interference between the mask pattern and the dot data or beading due thereto. Further, the similar problem possibly occurs in a case where a mutual relation between the mask patterns corresponding to ink colors and scans is not considered.

In particular, in the recent ink jet printing system, with remarkable advancement of high speed and high density printing and diversification of ink types, it is confirmed that a new problem in relation to the beading occurs. More specifically, the high speed and high density printing and the increasing ink types cause an increase in an amount of ink applied per unit time and unit area of the printing medium. In this case, depending on the printing medium, even if all the amount of ink applied can be finally absorbed, the absorbing speed may not catch up with an applying speed of the ink. That is, even if all the applied ink is finally absorbed and problems such as fixing properties or smears do not occur, ink drops which are not yet absorbed onto the surface of the printing medium may be contacted with each other during stages of scanning several times before completing an image. Thus, it is confirmed that this causes the problem with the beading in a subsequent image.

For example, it is considered a case where an image of blue expressed by cyan ink and magenta ink is printed by a multi pass printing system of a two-pass. In most of serial type ink jet printing apparatus, print heads of fundamental four-color ink of cyan, magenta, yellow and black are arranged in parallel in the primary scanning direction. In consequence, ink of each color is applied onto the same area of the printing medium during the same printing scan. More specifically, in the above case, ink based upon the data of cyan and magenta obtained by eliminating the dot data of cyan and magenta respectively by 1/2 with use of the mask pattern is applied onto the printing medium with an extremely short time difference during the same printing scan. At this point, when the cyan ink and the magenta ink to be applied are positioned in close proximity to each other, such as at the same pixel or at the neighboring pixels, the drops of the ink may be pulled with each other by mutual surface tensions to form a dot of two or more drops of ink (hereinafter, referred to as grain). Once such grain is formed, the ink applied at a position close to the grain tends to be pulled toward the grain. That is, the grain first generated becomes a core and the core gradually grows to finally form a large grain. Such grain remarkably appears primarily in a high density area having a great applying amount of ink. Thus, in a uniform image area, the state where that such large grains are irregularly scattered is recognized, which causes a damage in an image, so-called beading.

The phenomenon of the above grain is basically generated by applying a plurality of ink for a relatively short time at positions in close proximity to each other and the degree of the pulling force depends on the mutual surface tensions of the ink. Formation of the grain, however, does not rely only on the mutual surface tensions of the ink. For example, in a case where ink and a liquid producing coagulation or the like in reaction to the ink are applied by the same scanning, the contacted, respective liquids may be connected by a stronger chemical reaction to form a grain core.

In addition, when the ink of the same color is applied during the same scanning such as printing the ink of the same color by using two rows of nozzles during the same scanning, the grain may be generated among the inks by the two rows of the nozzles. Further, depending on an absorbing characteristic of the printing medium with respect to the applied ink, when the ink to be applied at different scans in the multi pass print is applied in close proximity to each other, the above grain may be generated.

Further, as the other cause of the above described grain problem, there exists an interference problem between a mask pattern and binarized dot data.

Figure 8:
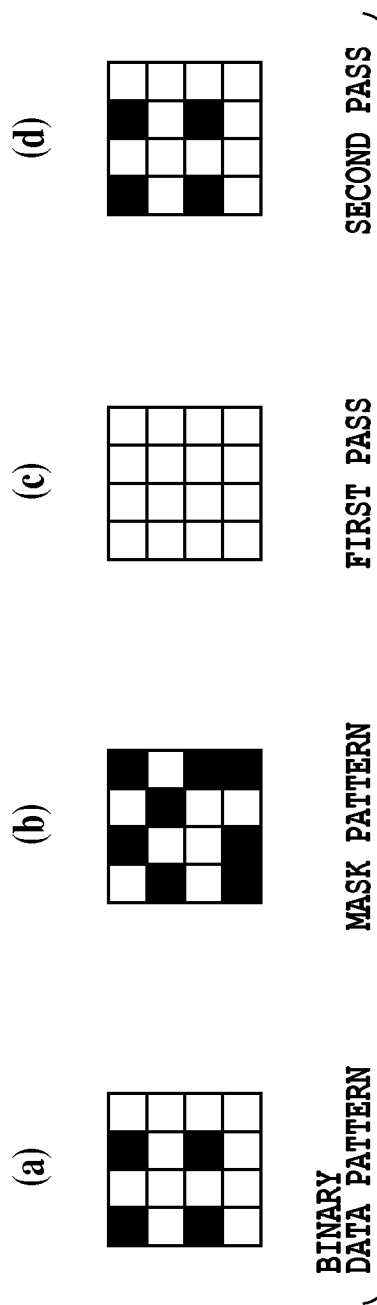
FIG. 8 is a diagram illustrating a problem of an interference by a mask pattern used for quantization of printing data.

FIG. 8 is a diagram explaining the problem of this interference. Reference sign (a) of FIG. 8 denotes a pattern of a binary image data of cyan and reference sign (b) of FIG. 8 shows a mask pattern (50% of areas shows printing permitting areas) at the first pass among mask patterns of cyan for a two-pass. A dimension of the pattern of the binary image data (a) is 4×4. On the other hand, the mask pattern (b) arranges print permitting areas in a dimension of 4×4 and corresponds to the pattern of the binary image data one by one.

In this case, at the first pass, a dot pattern shown by reference sign (c) of FIG. 8 which is a data obtained by an AND operation of the mask pattern and the binary image data pattern is printed. In other words, the binary image data (a) shows four dots to be formed, but in fact, the number of dots actually formed at the first pass is zero. In contrast, at the second pass shown by reference sign (d), all of the remaining four dots are formed. In this way, the interference between the mask pattern and the binary image data (dot data) is generated, thereby possibly bringing about various problems, such as the problem that a fundamental effect of the multi pass print is not achieved sufficiently. In addition to the example shown in FIG. 8, there may occur the reverse case, that is, a case where at the first pass, four dots are formed and at the second pass, the number of the formed dot is zero. In addition, this interference possibly occurs in combinations of various binary image data patterns and pass mask patterns corresponding thereto regardless of a size of the data.

The interference as described above possibly occurs in places in the mask processing for each scan to the entire binary image data. Then, an uneven arrangement of the dots due to the interference shown above with respect to a certain scan may lead to occurrence of a grain at the time of generating an image (hereinafter, also referred to as intermediate image) at a stage in the middle of completing the image by plural times of scans in the aforementioned multi-pass printing.

As described above, in a case of obtaining final dot data for each scan by using the dither pattern and the mask pattern, when the mutual relation between the dot data generated for respective scans or respective ink colors is not considered, the problem such as the aforementioned grain possibly occurs. The present embodiment prevents such grain from occurring. According to the present embodiment, threshold values of the dither pattern are dispersed with respect to the order of magnitudes of the threshold values and thus a result of divided dither processes obtained by multiplying respective division ratios, using the dither pattern comes to have dot data that is dispersed according to the dispersion of the threshold values with respect to the order of magnitudes. Further, since respective dither patterns for respective colors have dispersed arrangements of threshold values between respective colors, finally obtained dot arrangements of respective passes are dispersed between respective colors. In this way, according to the embodiment of the present invention, preventing increase of a memory amount and processing load as well as preventing occurrence of the grain problem can be achieved.

(Second Embodiment)

The above described first embodiment shows an example in which 256-valued image data is converted into 17-valued image data and for the 17-valued image data, binarization using a dither pattern is performed in conjunction with a pass division. In contrast, a second embodiment of the present invention relates to an example in which for the 256-valued image data, binarization using a dither pattern is performed in conjunction with a pass division.

Figure 9:
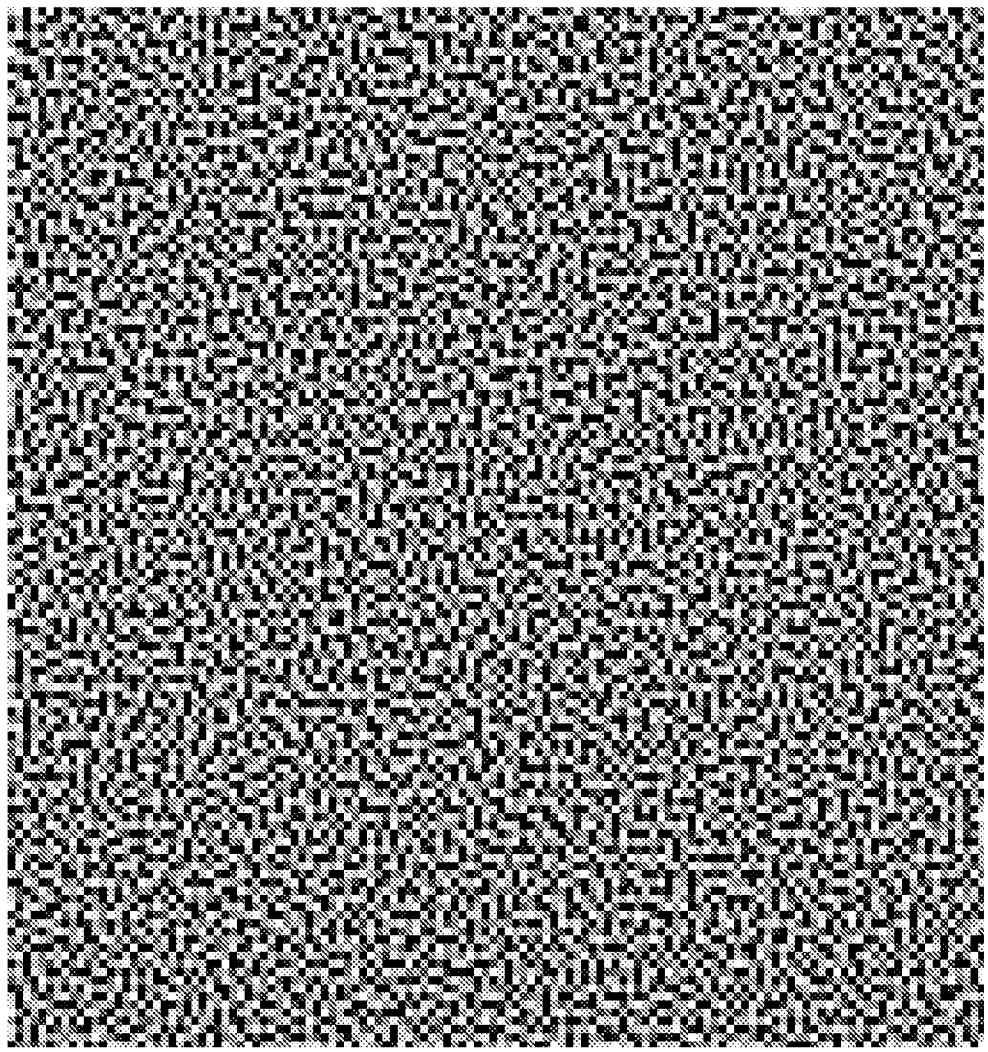
FIG. 9 is a view showing a dither pattern for binarizing image data of 256 values in the first embodiment.
Figure 10:
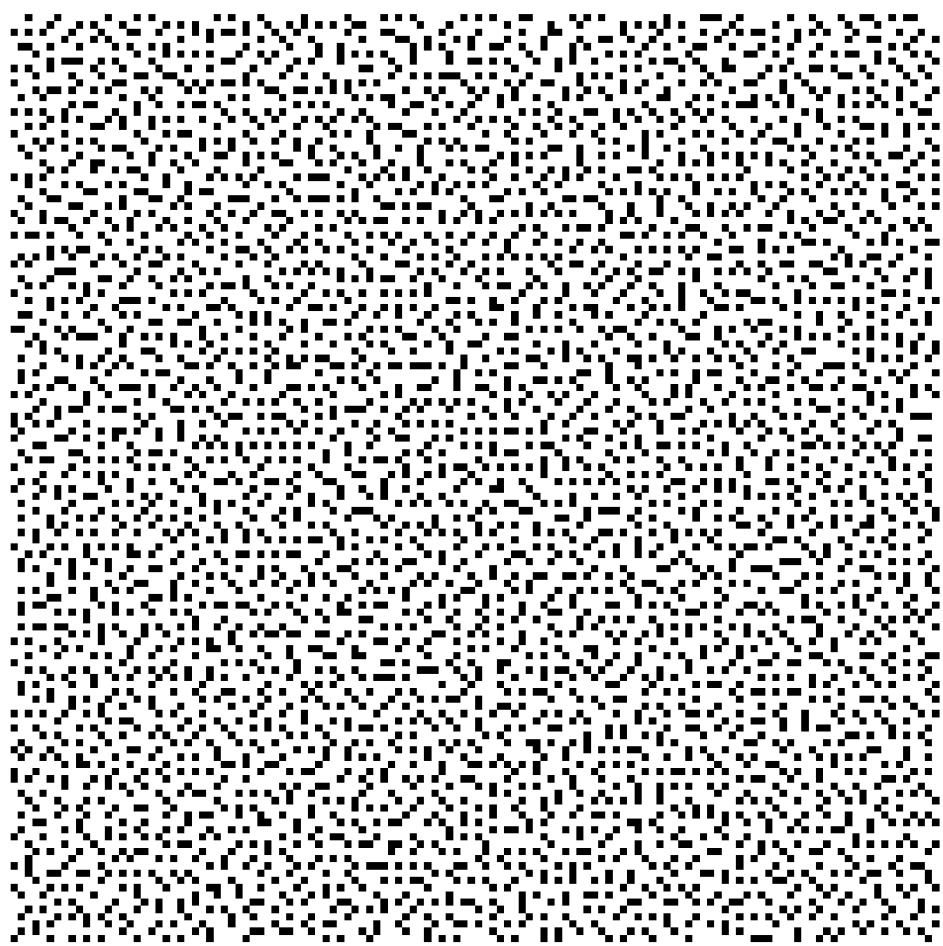
FIG. 10 is a view showing a dot data as a result of binarizing input image data as it is by the dither pattern shown in FIG. 9.
Figure 11:
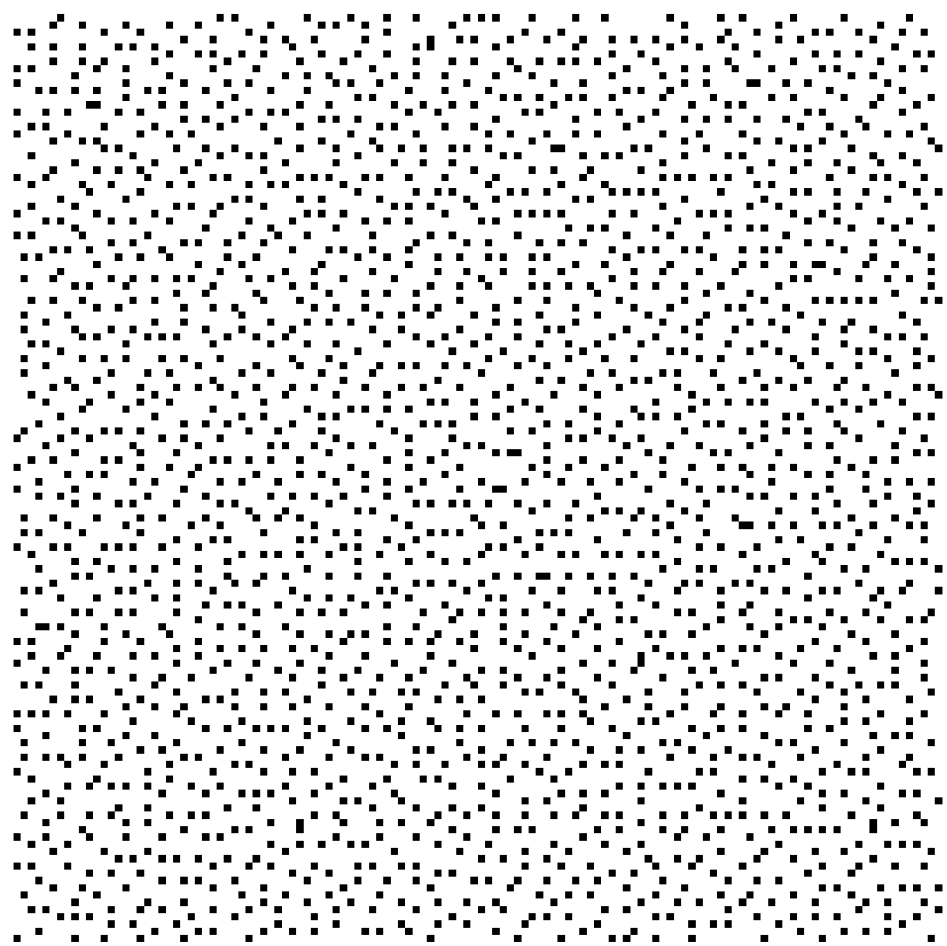
FIG. 11 is a view showing dot data as a result of binarizing the data obtained by multiplying each pixel value of the above input image data by 1/2, by the dither pattern shown in FIG. 9.

FIGS. 9 to 11 are diagrams showing two examples of a dither pattern and a binarized data in a case of simultaneously executing the pass division and the binarization processing, according to the second embodiment of the present invention. That is, as explained below, an image data is shown as an example where an image data of 8-bit 256 values is directly binarized.

The printing system in the present embodiment is, as described in FIG. 2, a multi pass system of a two-pass which sequentially completes printing for a predetermined area on the printing medium by two times of scan, similarly to the first embodiment. In this two-pass printing, the binary image data for ejecting ink from each ejection opening in each scan is generated by the image processing described later in FIG. 12. Thereby, as described in FIG. 3(*a*), the unevenness in the dot distribution in each superposition of planes obtained by superimposing C of a first pass, M of the first pass, Y of the first pass, Y of a second pass, M of the second pass and C of the second pass in that order can be made to be small.

Figure 12:
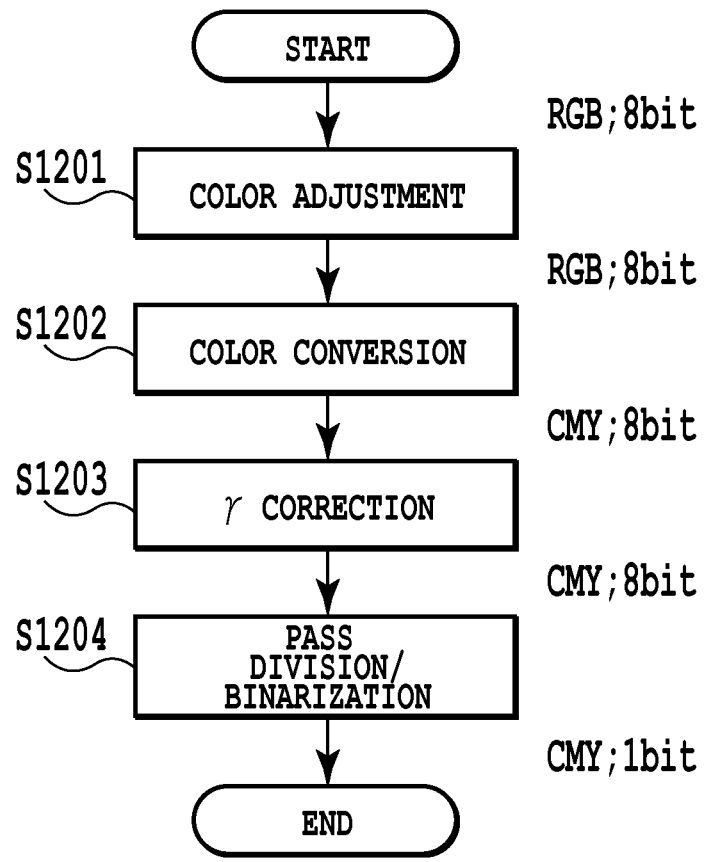
FIG. 12 is a flowchart showing an image process according to a second embodiment of the present invention.

FIG. 12 is a flow chart showing the processes of an image processing according to a second embodiment of the present invention. Respective processes of steps S1201 to S1203 shown in FIG. 12 are similar processes to the processes of steps S301 to S303 shown in FIG. 5.

Specifically, first at step S1201, color adjustment processing such as an input γ correction is executed for R, G and B data of the image obtained from an application or the like. Next, at step S1202, for image data of R, G and B, a conversion from a color gamut of R, G and B into a color gamut of color components C, M and Y of inks used in a printer is carried out and also a generation of the color component data C, M and Y for expressing the color in the color gamut obtained by the conversion is carried out. The processing of this step converts the image data of 8 bits for each of R, G and B into the image data of 8 bits for each of C, M and Y (multi-valued image data).

Then, for each of thus obtained 8-bit 256 valued image data of C, M and Y, at step S1204 a pass division and binarization are simultaneously performed. Dither patterns used in the present embodiment is one which is created for each color by a method disclosed in Japanese Patent Laid-Open No. 2006-050596. Specifically, the respective dither patterns have the arrangements of the threshold values in which the threshold values are dispersed in relation to the order of magnitudes of the threshold values. In addition, the respective dither patterns have the arrangements of the threshold values in which the threshold values are dispersed in relation to the order of magnitudes of the threshold values also between ink colors.

In this way, not only the binarization but also the pass division is carried out by using the dither pattern in which the arrangements of the threshold values are dispersed. Thereby, arrangements of dots formed for each pass are dispersed at each pass and also between passes. Further, the dot arrangements are dispersed even between passes having different ink colors. As a result, the uneven arrangement of the dots formed in the middle of printing is eliminated, making it possible to reduce the grain or the beading.

Figure 13:
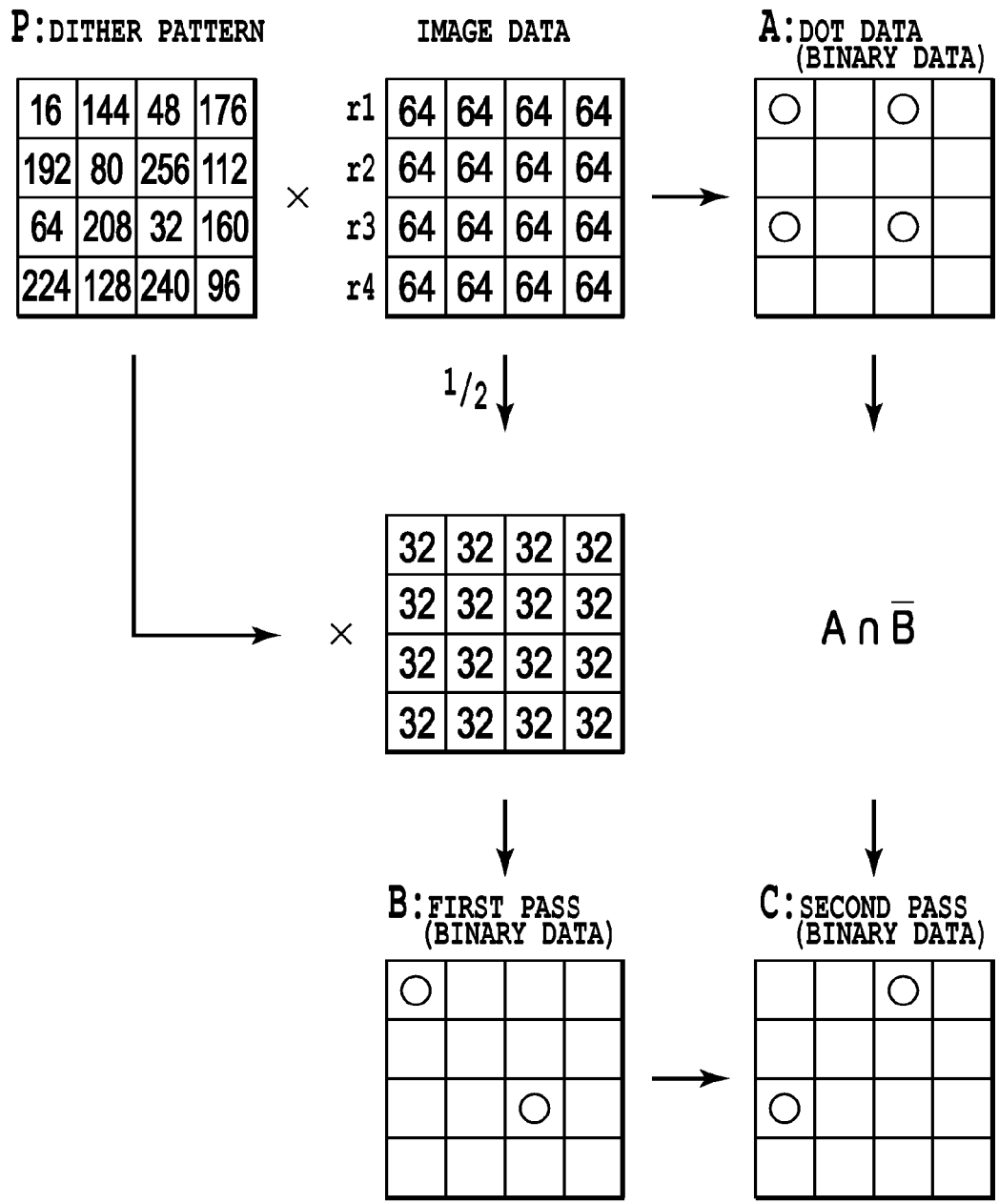
FIG. 13 is a diagram schematically showing a pass division/binarization process shown in FIG. 12.

FIG. 13 is a diagram schematically showing the pass division/binarization processing at step S1204 in FIG. 12. FIG. 13 expresses a dither pattern of a dimension of 128 pixels×128 pixels corresponding to the 128 nozzles in a unit area width of the two-pass print shown in FIG. 2 and planes of data processed by using the dither pattern, in patterns of 4 pixels×4 pixels for simplification of the explanation and the illustration.

In FIG. 13, the dither pattern P is a dither pattern for a single color of cyan (C) generated by a method disclosed in Japanese Patent Laid-Open No. 2006-050596. As shown in FIG. 13, the threshold values 1 to 256 are arranged to be dispersed in relation to the order of magnitudes of the threshold values. An image data shows a so-called solid image where, as one example, every value of all pixels is "64".

In the pass division/binarization processing for the two-pass in the present embodiment, first, there is executed the process of dividing each value of the image data by the pass number of 2. Specifically, when this number of 2 is set as a denominator, firstly this processing executes a calculation of multiplying each value of the image data by a ratio of 1/2 as a numerator of 1. In this way, for obtaining the dot data of the first pass, here the division ratio of the image data is set as 1/2 which is the same as the above ratio. This calculation produces the divided data where every value of all pixels is "32".

Next, binarization is executed for the divided data, by using the dither pattern P. This produces binary (dot) data B for the first pass. As shown in FIG. 13, the dot data B shows the data where "1" (circle sign) is arranged at each of the pixels corresponding to the threshold values of "16" and "32".

Next, there is produced the data of a product of a division ratio obtained by a ratio (1/2+1/2) by adding 1/2 to the above ratio and each value of the image data. That is, a calculation of multiplying a value of each pixel of the image data by 2/2 is performed. For obtaining the dot data at the second pass thus, here the division ratio of the image data is set as "2/2" obtained by adding the above ratio. The reason for it is that dot arrangements by the image data multiplied by 1/2 in the dot data generation at the first pass are accumulated, which is reflected in dot arrangements at the next second pass, as described in the first embodiment. In other words, there is reflected a state where the dots are already arranged at the first pass to the pixels corresponding to the threshold values of "16" and "32" in the dither pattern P. It should be noted that since the division ratio is 2/2 in a case of the two-pass like the present example, the data obtained by multiplying of this division ratio becomes original image data. Therefore, an algorithm where a calculation of obtaining a product of the division ratio is not performed may be used. Then, the binarization is carried out for the original image data by using the dither pattern P, thus obtaining binary (dot) data A. Finally dot data C for the second pass are obtained by subtracting data B from data A. Specifically, a logical product of data A and a negative of data B is obtained between the corresponding pixels. The pass division and binarization processing to which the dither pattern as described above is applied is repeated until the dot data of one plane of "the number of pixels corresponding to the print width (primary scanning direction)×128 pixels (nozzle arrangement direction)" is obtained.

As described above, according to the present embodiment, multi-valued image data is divided according to different division ratios corresponding to respective passes (respective printing operations), each of divided multi-valued image data is binarized using same dither pattern, and dot data for each pass is generated based on a result of binarization. In this dot generation, the dot data of each pass is generated so that dots are arranged to different positions in each pass.

It should be noted that, as is seen apparently from the above explanation, the "ratio" corresponds to a printing ratio of each image divided finally. In addition, in the above description, it is explained that the first-pass data and the second-pass data are successively obtained in this order, but this order is made for explanatory convenience and the process order is not limited thereto. The process of multiplying an image data by a division ratio of 1/2 may be first executed or the process of multiplying an image data by a division ratio of 2/2 may be first executed. In addition, the binarization process using the dither pattern for the result of multiplying of the division ratio may be executed in any order. Further, the processing of finally obtaining a dot data for each pass by subtraction between two data in regard to the dot data as a result of the binarization may be executed in any order. In addition, although in description referring to FIG. 13 the dither pattern simple arrangement of the threshold values for simplification of the description, examples shown in FIGS. 9 to 11 are determined according to the method disclosed in Japanese Patent Laid Open No. 2006-050596 but have more complicated arrangements of threshold values of 1 to 256.

FIG. 9 shows a dither pattern in a size of 128 pixels×128 pixels for binarizing an image data of 8-bit 256 values and the dither pattern is generated by the method described in Japanese Patent Laid-Open No. 2006-050596. That is, the threshold values of 1 to 256 are arranged to be dispersed in relation to the order of magnitudes of the threshold values. It should be noted that FIG. 9 shows the threshold value of each pixel as a pattern of density corresponding to the magnitudes (patterns of 8-bit map data).

FIG. 10 is, at the time of using a solid image of 8 bits of each pixel of 25% density (pixel value of 64) as an image data, a diagram showing a dot data as a result of binarizing the image data as it is by using the dither pattern shown in FIG. 9. This corresponds to dot data A shown in FIG. 13.

Further, FIG. 11 is a diagram showing a dot data as a result of binarizing the data (of 12.5% density) obtained by multiplying each pixel value of the image data of 25% density by 1/2, with use of the dither pattern shown in FIG. 9. This corresponds to dot data B for the first pass shown in FIG. 13. Then, the data corresponding to dot data C for the second pass shown in FIG. 13 is obtained by subtracting the data shown in FIG. 11 from the data shown in FIG. 10. Specifically, the data for the second pass can be obtained by a logic product of the data in FIG. 10 and a negative of the data in FIG. 11. It is apparent from FIG. 11 and a relation between FIG. 11 and FIG. 10 that the dot arrangements for each pass are properly dispersed.

It should be noted that a dither pattern to be used is not limited to the aforementioned example, needless to say. For example, there may be used a dither pattern as disclosed in Japanese Patent Laid-Open No. 2001-298617 where the dispersion between colors is not considered but arrangements of threshold values are dispersed in one dither pattern in the same way as the above. This allows the dot arrangements between passes in regard to at least each color to be dispersed.

Further, not limited to the dither pattern described in Japanese Patent Laid-Open No. 2006-050596 or 2001-298617, but any other dither pattern generally used may be used. According to this configuration, even in a case where the dot arrangements for each pass finally obtained are not properly dispersed, only by using the dither pattern, the division data for each pass can be obtained and also the binarization can be carried out. As a result, there can be achieved the effect of preventing an increase in a size of a memory for storing pattern data.

As described above, according to the second embodiment of the present invention, the dither pattern is simultaneously used for both binarization and a pass division so as to prevent increase of a memory amount and a processing load as well as occurring of a grain problem.

(Third Embodiment)

A third embodiment of the present invention relates to pass division and binarization processing for a four-pass printing. Specifically, 8-bit 256 valued image data is once converted into 17 valued data and for the 17 valued data the binarization and the pass division are simultaneously performed.

Figure 14:
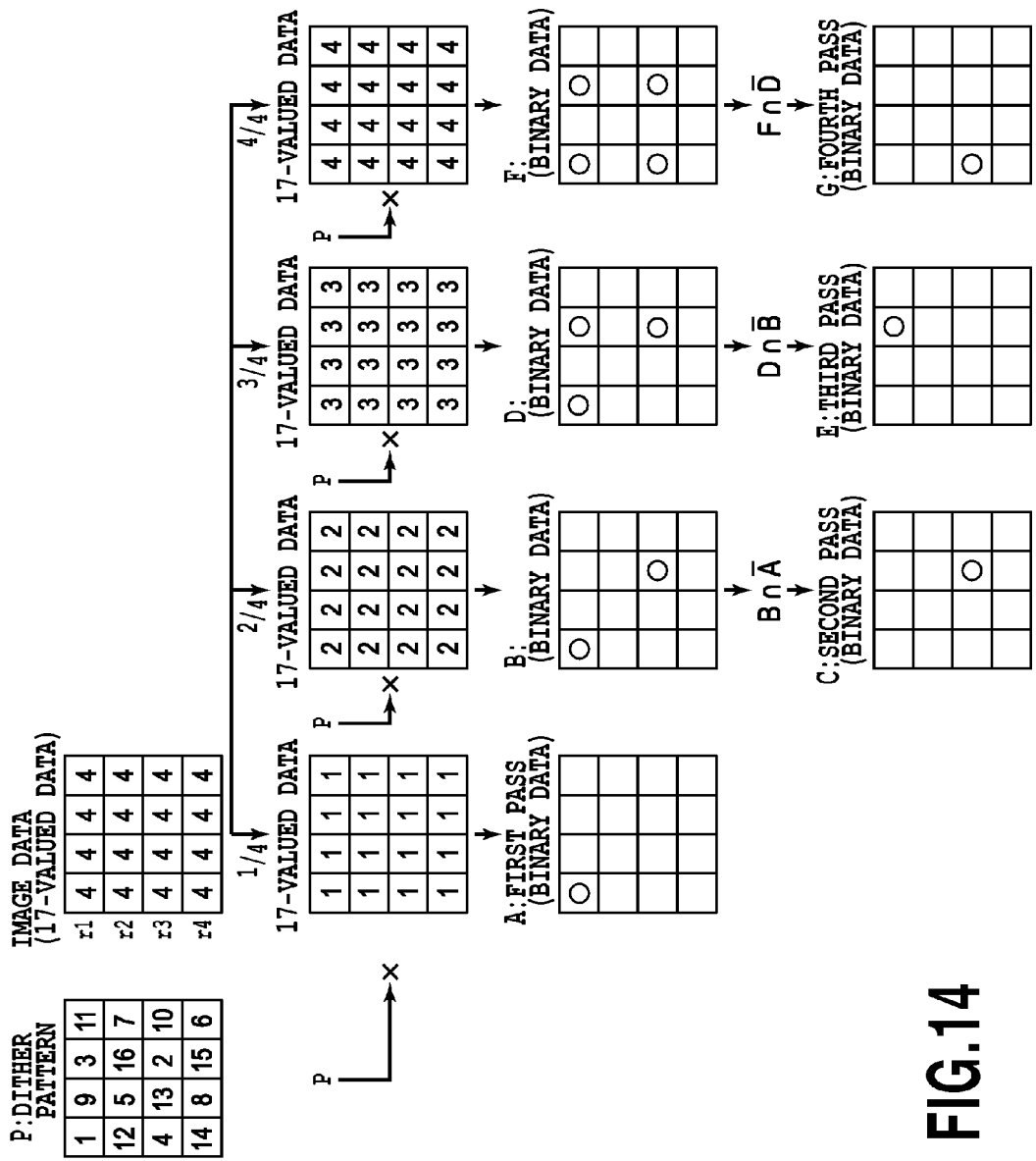
FIG. 14 is a diagram for explaining a pass division/binarization process according to a third embodiment of the present invention.

FIG. 14 is a diagram explaining pass division/binarization processing according to the present embodiment. The contents of a dither pattern and an image data of 17 values shown in FIG. 14 are the same as that shown in FIG. 7 respectively. It should be noted that in a case of using a print head having the same number of nozzles as in the first embodiment, a size in the longitudinal direction in FIG. 14 (corresponding to the nozzle arrangement direction) of an applied dither pattern and an image data for which the pass division and binarization are performed by using the dither pattern is actually a half of that shown in FIG. 14. However, for explanatory simplification, the dither pattern and the image data which are the same in a size as at the two-pass in the first embodiment will be used for explanation.

First the processing of dividing each value of the image data by the pass number of 4 is executed. Specifically, when this number of 4 is set as a denominator, firstly this processing executes a calculation of multiplying each pixel value of the image data by a ratio (printing ratio) of 1/4 as a numerator: 1. In this way, for obtaining the dot data for the first pass, here the division ratio of the image data is set as "1/4" which is the same as the above ratio. This produces the divided 17-valued data where every value of all pixels is "1". Next, the binarization is carried out for the divided data by using the dither pattern P. This produces binary (dot) data A for the first pass. As shown in FIG. 14, dot data A shows a data where "1" (circle sign) is arranged at each of the pixels corresponding to the threshold value of "1" in the dither pattern P.

Next, there is produced a data by a product of a division ratio (1/4+1/4) obtained by adding a ratio of 1/4 to the above ratio and each value of the image data. Specifically, a calculation of multiplying a value of each pixel of the image data by 2/4 is carried out. For obtaining the dot data for the second pass thus, here the division ratio of the image data is set as "2/4" obtained by adding the above ratios. This is, as described in FIG. 7, because the dot arrangements at the first pass are cumulatively reflected in the dot arrangements for the second pass. By the above calculation, the divided 17-valued data where every value of all pixels is "2" can be obtained. Next, the binarization is carried out for the divided data by using the dither pattern P, obtaining binary (dot) data B. The dot arrangements of data B are made in such a manner that "1" (circle sign) is arranged at each of the pixels corresponding to the threshold values of "1" and "2". Then, the data obtained by subtracting data A obtained by multiplying of 1/4 (in this case, second division ratio) from data B by multiplying of 2/4 (in this case, first division ratio) is set as dot data C for the second pass. That is, a logical product of data B and a negative of data A is obtained between the corresponding pixels and is set as dot data C.

Similarly, in a case of obtaining a data for the third pass, first a calculation of multiplying a value of each pixel of the image data by 3/4 (1/4+1/4+1/4) is carried out, thereby obtaining the divided 17-valued data where every value of all pixels is "3". For obtaining the dot data for the third pass thus, here the division ratio of the image data is set as "3/4" obtained by adding the above ratios. Next, the binarization is carried out for the divided data by using dither pattern P, obtaining binary (dot) data D. The dot arrangements of data D are made in such a manner that "1" (circle sign) is arranged at each of the pixels corresponding to the threshold values of "1", "2" and "3". Then, as is similar to the above, the data obtained by subtracting data B obtained by multiplying of 2/4 (in this case, second division ratio) from data D by multiplying of 3/4 (in this case, first division ratio) is set as dot data E for the third pass. That is, a logical product of data D and a negative of data B is obtained between the corresponding pixels and is set as dot data E.

Finally, in a case of obtaining a data for the fourth pass, first a calculation of multiplying a value of each pixel of the image data by 4/4 (1/4+1/4+1/4+1/4) is carried out, thereby obtaining the divided 17-valued data where every value of all pixels is "4". For obtaining the dot data for the fourth pass thus, here the division ratio of the image data is set as "4/4" obtained by adding the above ratios. It should be noted that since this data is the same as an original image data, an algorithm where the original data is used as it is without the process of multiplying of 4/4 may be used. Next, the binarization is carried out for the divided data by using a dither pattern P, obtaining binary (dot) data F. The dot arrangements of data F are made in such a manner that "1" (circle sign) is arranged at each of the pixels corresponding to the threshold values of "1", "2", "3". and "4" Then, likewise the data obtained by subtracting data D from data F is set as dot data G for the fourth pass. That is, a logical product of data F and a negative of data D is obtained between the corresponding pixels and is set as dot data G.

As explained above, also in the present embodiment, both obtaining the divided data for each pass and the binarization can be performed by using only the dither pattern. As a result, while a conventional art requires both a dither pattern for binarization and a mask pattern for a pass division, the present embodiment has only to use the dither pattern to prevent a memory size for storing pattern data and a processing load from increasing. In addition, the threshold values in the dither pattern P are dispersed with respect to an order of magnitudes of the threshold values and thus a result of dither processing using the pattern P for divided 17-valued data obtained by multiplying each ratio has an arrangement of dot data which is dispersed according to the dispersion with respect to the order of the magnitudes. As a result, finally obtained respective dot data A, C, E, G of the first to fourth pass are dispersedly arranged in respective planes of passes and are also dispersedly arranged between respective dot data. Further, since the respective dither pattern P for respective ink colors have arrangements of threshold values which are dispersed between ink colors as described in Japanese Patent Laid-open No. 2006-050596, finally obtained dot arrangements for respective passes are dispersed between ink colors.

(Fourth Embodiment)

A fourth embodiment of the present invention is related to a configuration that directly binarizes 8-bit 256 valued image data using a dither pattern and simultaneously perform a pass division with respect to four passes.

Figure 15:
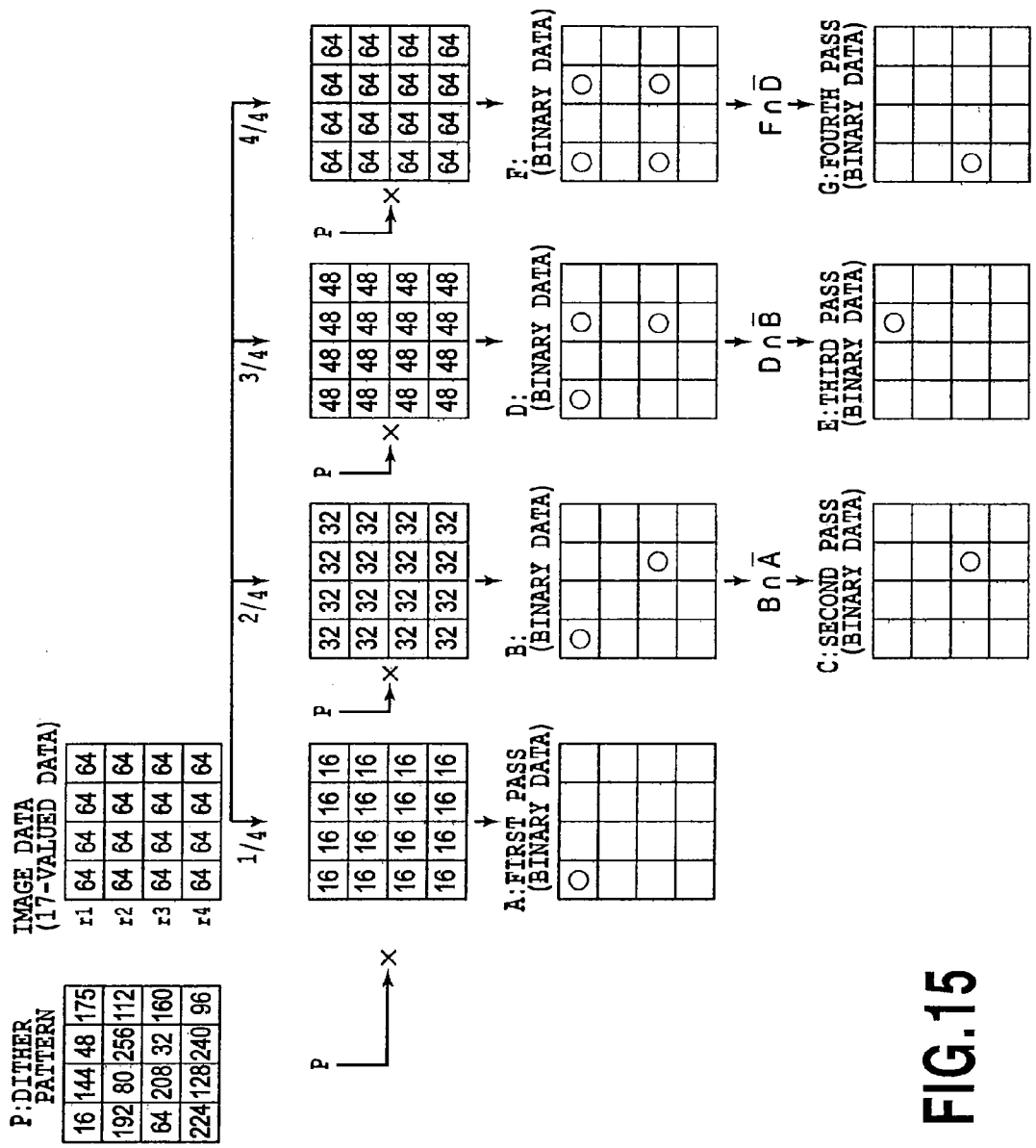
FIG. 15 is a diagram for explaining a pass division/binarization process according to a fourth embodiment of the present invention.

FIG. 15 is a diagram explaining pass division/binarization processing according to the present embodiment, and shows the same processing as that of step S1204 in FIG. 12. However, a difference from the processing of step S1204 is dividing data into four passes. In addition, the contents of a dither pattern and an image data shown in FIG. 15 are the same as that shown in FIG. 13 respectively.

First the processing of dividing each value of the image data by the pass number of 4 is executed. Specifically, when this number of 4 is set as a denominator, firstly this processing executes a calculation of multiplying each pixel value of the image data by a ratio (printing ratio) of 1/4 as a numerator: 1. In this way, for obtaining the dot data for the first pass, here the division ratio of the image data is set as "1/4" which is the same as the above ratio. This produces the divided 8-bit 256-valued data where every value of all pixels is "16". Next, the binarization is carried out for the divided data by using the dither pattern P. This produces binary (dot) data A for the first pass. As shown in FIG. 15, dot data A shows a data where "1" (circle sign) is arranged at each of the pixels corresponding to the threshold value of "16" in the dither pattern P.

Next, there is produced a data by a product of a division ratio (1/4+1/4) obtained by adding a ratio of 1/4 to the above ratio and each value of the image data. Specifically, a calculation of multiplying a value of each pixel of the image data by 2/4 is carried out. For obtaining the dot data for the second pass thus, here the division ratio of the image data is set as "2/4" obtained by adding the above ratios. This is, as described in FIG. 14, because the dot arrangements at the first pass are cumulatively reflected in the dot arrangements for the second pass. By the above calculation, the divided 8-bit data where every value of all pixels is "32" can be obtained. Next, the binarization is carried out for the divided data by using the dither pattern P, obtaining binary (dot) data B. The dot arrangements of data B are made in such a manner that "1" (circle sign) is arranged at each of the pixels corresponding to the threshold values of "16" and "32". Then, the data obtained by subtracting data A obtained by multiplying of 1/4 (in this case, second division ratio) from data B by multiplying of 2/4 (in this case, first division ratio) is set as dot data C for the second pass. That is, a logical product of data B and a negative of data A is obtained between the corresponding pixels and is set as dot data C.

Similarly, in a case of obtaining a data for the third pass, first a calculation of multiplying a value of each pixel of the image data by 3/4 (1/4+1/4+1/4) is carried out, thereby obtaining the divided data where every value of all pixels is "48". For obtaining the dot data for the third pass thus, here the division ratio of the image data is set as "3/4" obtained by adding the above ratios. Next, the binarization is carried out for the divided data by using dither pattern P, obtaining binary (dot) data D. The dot arrangements of data D are made in such a manner that "1" (circle sign) is arranged at each of the pixels corresponding to the threshold values of "16", "32" and "48". Then, as is similar to the above, the data obtained by subtracting data B obtained by multiplying of 2/4 (in this case, second division ratio) from data D by multiplying of 3/4 (in this case, first division ratio) is set as dot data E for the third pass. That is, a logical product of data D and a negative of data B is obtained between the corresponding pixels and is set as dot data E.

Finally, in a case of obtaining a data for the fourth pass, first a calculation of multiplying a value of each pixel of the image data by 4/4 (1/4+1/4+1/4+1/4) is carried out, thereby obtaining the divided 8-bit data where every value of all pixels is "64". For obtaining the dot data for the fourth pass thus, here the division ratio of the image data is set as "4/4" obtained by adding the above ratios. Next, the binarization is carried out for the divided data by using a dither pattern P, obtaining binary (dot) data F. The dot arrangements of data F are made in such a manner that "1" (circle sign) is arranged at each of the pixels corresponding to the threshold values of "16", "32", "48". and "64" Then, likewise the data obtained by subtracting data D from data F is set as dot data G for the fourth pass. That is, a logical product of data F and a negative of data D is obtained between the corresponding pixels and is set as dot data G. It should be noted that the dither pattern shown in FIG. 15 is created by the method disclosed in Japanese Patent Laid-open No. 2006-050596, and actual arrangement of the threshold values is more complicated one.

As explained above, also in the present embodiment, both obtaining the divided data for each pass and the binarization can be performed by using only the dither pattern. As a result, while a conventional art requires both a dither pattern for binarization and a mask pattern for a pass division, the present embodiment has only to use the dither pattern to prevent a memory size for storing pattern data and a processing load from increasing. In addition, the threshold values in the dither pattern P are dispersed with respect to an order of magnitudes of the threshold values and thus a result of dither processing using the pattern P for divided 17-valued data obtained by multiplying each ratio has an arrangement of dot data which is dispersed according to the dispersion with respect to the order of the magnitudes. As a result, finally obtained respective dot data A, C, E, G of the first to fourth pass are dispersedly arranged in respective planes of passes and are also dispersedly arranged between respective dot data. Further, since the respective dither pattern P for respective ink colors have arrangements of threshold values which are dispersed between ink colors as described in Japanese Patent Laid-open No. 2006-050596, finally obtained dot arrangements for respective passes are dispersed between ink colors.

(Fifth Embodiment)

A fifth embodiment of the present invention relates to an example in which a smooth change (gradation) of a printing ratio (arrangement density of dots) is determined for each pass. The gradation is a print pattern where a printing ratio differs in accordance with a nozzle position in such a manner that the printing ratio of raster corresponding to an end of a nozzle row is set to be low and the printing ratio of raster corresponding to a central portion of the nozzle row is set to be high. Such print pattern allow an ejection frequency of the end nozzle, which tends to be the cause of producing the problem in a boundary of a printing area for each pass in multi-pass printing, to be relatively reduced so as to obtain an effect of improving an image quality.

Here, "printing ratio" is a ratio of the number of pixels to which dots are printed to the number of all pixels (sum of the number of pixels to which dots are printed and the number of pixels to which dots are not printed) contained in a given area. For example, a printing ratio of an area corresponding to a single nozzle is a ratio of the number of dot print pixels to the number of all pixels contained in an area (single raster area) corresponding to the single nozzle. It should be noted that "ratio" described in the first and fourth embodiments corresponds to the printing ratio.

It should be noted that it is general to carry out gradation printing by using a mask pattern. More specifically, when a ratio of print permitting pixels to a sum of the print permitting pixels and print non-permitting pixels in a mask pattern is defined to be a printing ratio, the mask processing is executed by using a mask where the printing ratio is changed in accordance with the nozzle position as described above. Here, the print permitting pixel is a pixel that outputs data of a pixel of image data without change, which pixel corresponds to the print permitting pixel. On the other hand, the print non-permitting pixel is a pixel that masks data of a pixel in the image data which pixel corresponds to the print non-permitting pixel.

Figure 16:
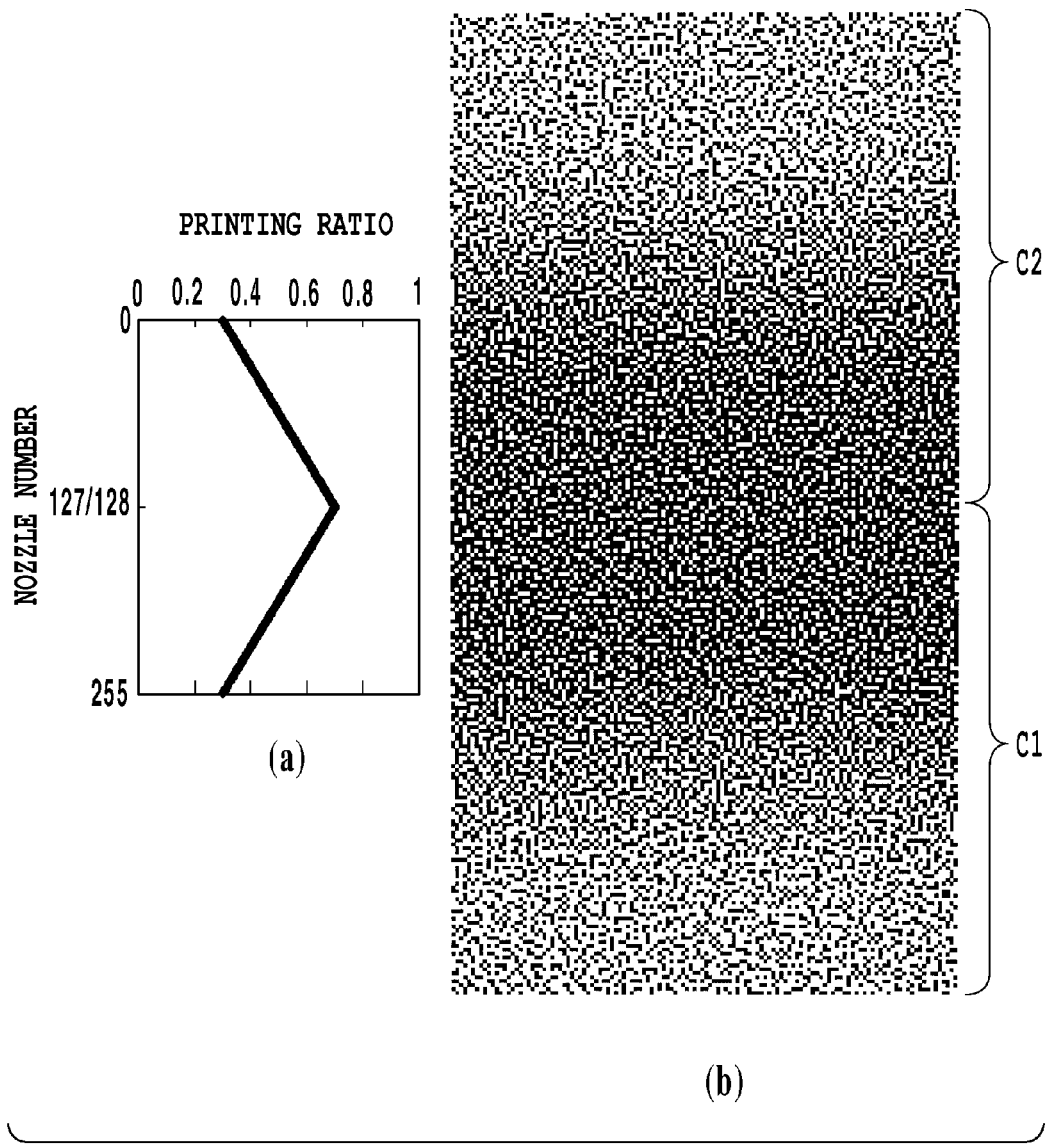
FIG. 16 is diagram for explaining gradation printing for each pass in two-pass printing in a fifth embodiment of the present invention.

FIG. 16 is diagram for explaining a gradation printing for each pass in a two-pass printing according to the present embodiment.

FIG. 16(b) shows a conventionally used gradation mask as a printing pattern for one pass. Specifically, the print permitting pixels are expressed with dots to be printed (black dots). In FIG. 16(b), C1 denotes dot data for the first pass in a case of printing a solid image of 100% density with two passes and C2, likewise, denotes dot data for the second pass of the solid image. The dot arrangements of C1 and C2 have a mutually complementary relation and the solid image of 100% density is completed by twice of scans. In addition, these dot data correspond to nozzle arrangement rows of 256 nozzles. An upper side of data C1 composed of 128 pixels in the longitudinal direction in the figure and a lower side of data C2 composed of 128 pixels in the longitudinal direction in the figure correspond to a central portion of the nozzle arrangement rows. On the other hand, a lower side of data C1 and an upper side of data C2 correspond to respective end sides of the nozzle arrangement rows.

FIG. 16(a) shows a printing ratio for each nozzle of the nozzle arrangement composed of 256 nozzles. In an example shown in this figure, a printing ratio corresponding to the nozzles of the numbers 127 and 128 at the central portion in the nozzle arrangement rows is 0.7 and a printing ratio corresponding to the nozzles of the numbers 0 and 255 at the ends in the nozzle arrangement rows is 0.3. In addition, data C1 corresponds to nozzles 128 to 255 and data C2 corresponds to nozzles 0 to 127.

The fifth embodiment of the present invention carries out generation of the dot data for such gradation printing by simultaneously performing pass division and binarization with use of a dither pattern.

A case of a two-pass printing will be explained with reference to FIG. 7. Specifically, in a case of gradation printing, a calculation of multiplying by a printing ratio explained in FIG. 16(a) for each raster of an image data is made in place of multiplying by 1/2 explained in FIG. 7.

An image data in a size of 4 pixels×4 pixels shown in FIG. 7 corresponds to a half of nozzle arrangement row (in the example in FIG. 16(a), the nozzles 0 to 127 or the nozzles 128 to 255) as described above. When the respective lines in the scanning direction of the image data are defined to be raster r1, r2, r3 and r4 as shown in FIG. 7, the printing ratio is made different for each raster. For example, 0.7 is allotted to raster r1 corresponding to a central nozzle, 0.56 is allotted to raster r2 and 0.43 is allotted to raster r3 and 0.3 is allotted to raster r4 corresponding to an end nozzle. Then, each pixel value of the corresponding raster is multiplied by each printing ratio, making it possible to obtain the divided image data. In a case of the above printing ratios, the pixel value of raster r1 is obtained as 4×0.7=2.8, the pixel value of raster r2 is obtained as 4×0.56=2.24, the pixel value of raster r3 is obtained as 4×0.44=1.76 and the pixel value of raster r4 is obtained as 4×0.3=1.2.

Binarization is carried out for the divided image data by using the dither pattern P, obtaining the dot data for the first pass. In a case of the dither pattern and the image data shown in FIG. 7, the dot data for the first pass is the data where dots are arranged at pixels corresponding to pixels in which the threshold value of the dither pattern P is "1".

Next, in the same way with the explanation in FIG. 7 for the first embodiment, there is provided a calculation of multiplying an image data by a printing ratio to which the printing ratio for the first pass is cumulatively added. Specifically, in the dot pattern for the second pass, the gradation is made in reverse as shown in FIG. 16(a), so that 0.7 is allotted to raster r4 corresponding to a central nozzle, 0.56 is allotted to raster r3 and 0.43 is allotted to raster r2 and 0.3 is allotted to raster r1 corresponding to an end nozzle. At this point, the printing ratio is made by cumulatively adding the printing ratio for the first pass. That is, the printing ratio is made by adding the printing ratio for the first pass (0.7, 0.56, 0.44 and 0.3) to the printing ratio of the pattern for the second pass (0.3, 0.44, 0.56 and 0.7) for each raster. That is, the printing ratio becomes 1 for each raster (0.7+0.3, 0.56+0.44, 0.44+0.56 and 0.3+0.7).

In other words, as in the case of the first and second embodiments, the final pass uses the image data as it is and binarization is carried out for this image data by using the dither pattern. Specifically, the dot data for the second pass is obtained by subtracting the dot data for the first pass from dot data A as a result of binarizing original image data by using the dither pattern P. The dot data for the second pass is the data where dots are arranged at pixels corresponding to pixels in the dither pattern P in which the threshold values of the dither pattern P are "2", "3" and "4".

The above description is related to a gradation example in which 8-bit 256-valued image data is converted to 17-valued data and then a binarization and pass division are performed for the 17-valued data. As a further gradation example, an example in which in a case of directly binarizing 256-valued image data, a gradation pattern is printed in each of two passes will be described below. Specifically, in the case of gradation printing, a calculation of multiplying by a printing ratio explained in FIG. 16(a) for each raster of an image data is made in place of multiplying by 1/2 explained in FIG. 13.

An image data in a size of 4 pixels×4 pixels shown in FIG. 13 corresponds to a half of nozzle arrangement row (in the example in FIG. 16(a), the nozzles 0 to 127 or the nozzles 128 to 255) as described above. When the respective lines in the scanning direction of the image data are defined to be raster r1, r2, r3 and r4 as shown in FIG. 13, the printing ratio is made different for each raster. For example, 0.7 is allotted to raster r1 corresponding to a central nozzle, 0.56 is allotted to raster r2 and 0.43 is allotted to raster r3 and 0.3 is allotted to raster r4 corresponding to an end nozzle. Then, each pixel value of the corresponding raster is multiplied by each printing ratio, making it possible to obtain the divided image data. In a case of the above printing ratios, the pixel value of raster r1 is obtained as 64×0.7=44.8, the pixel value of raster r2 is obtained as 64×0.56=35.84, the pixel value of raster r3 is obtained as 64×0.44=28.16 and the pixel value of raster r4 is obtained as 64×0.3=19.2. Although the above description is made by using the dither pattern of 4 pixels×4 pixels and ratios for raster r1, r2, r3, r4 being 0.7, 0.56, 0.43, 0.3 for simplification of description, actually the dither pattern shown in FIG. 9 and the printing ratios shown in FIG. 16(a) are used.

Binarization is carried out for the divided image data by using the dither pattern P, obtaining the dot data for the first pass. In a case of the dither pattern and the image data shown in FIG. 13, the dot data for the first pass is the data where dots are arranged at pixels corresponding to pixels in which the threshold value of the dither pattern P is "16".

Next, in the same way with the explanation in FIG. 13 for the second embodiment, there is provided a calculation of multiplying an image data by a printing ratio to which the printing ratio for the first pass is cumulatively added. Specifically, in the dot pattern for the second pass, the gradation is made in reverse as shown in FIG. 16(a), so that 0.7 is allotted to raster r4 corresponding to a central nozzle, 0.56 is allotted to raster r3 and 0.43 is allotted to raster r2 and 0.3 is allotted to raster r1 corresponding to an end nozzle. At this point, the printing ratio is made by cumulatively adding the printing ratio for the first pass. That is, the printing ratio is made by adding the printing ratio for the first pass (0.7, 0.56, 0.44 and 0.3) to the printing ratio of the pattern for the second pass (0.3, 0.44, 0.56 and 0.7) for each raster. That is, the printing ratio becomes 1 for each raster (0.7+0.3, 0.56 4 0.44, 0.44+0.56 and 0.3+0.7).

In other words, as in the case of the first and second embodiments, the final pass uses the image data as it is and binarization is carried out for this image data by using the dither pattern. Specifically, the dot data for the second pass is obtained by subtracting the dot data for the first pass from dot data A as a result of binarizing original image data by using the dither pattern P. The dot data for the second pass is the data where dots are arranged at pixels corresponding to pixels in the dither pattern P in which the threshold values of the dither pattern P are "32", "48" and "64".

Figure 17:
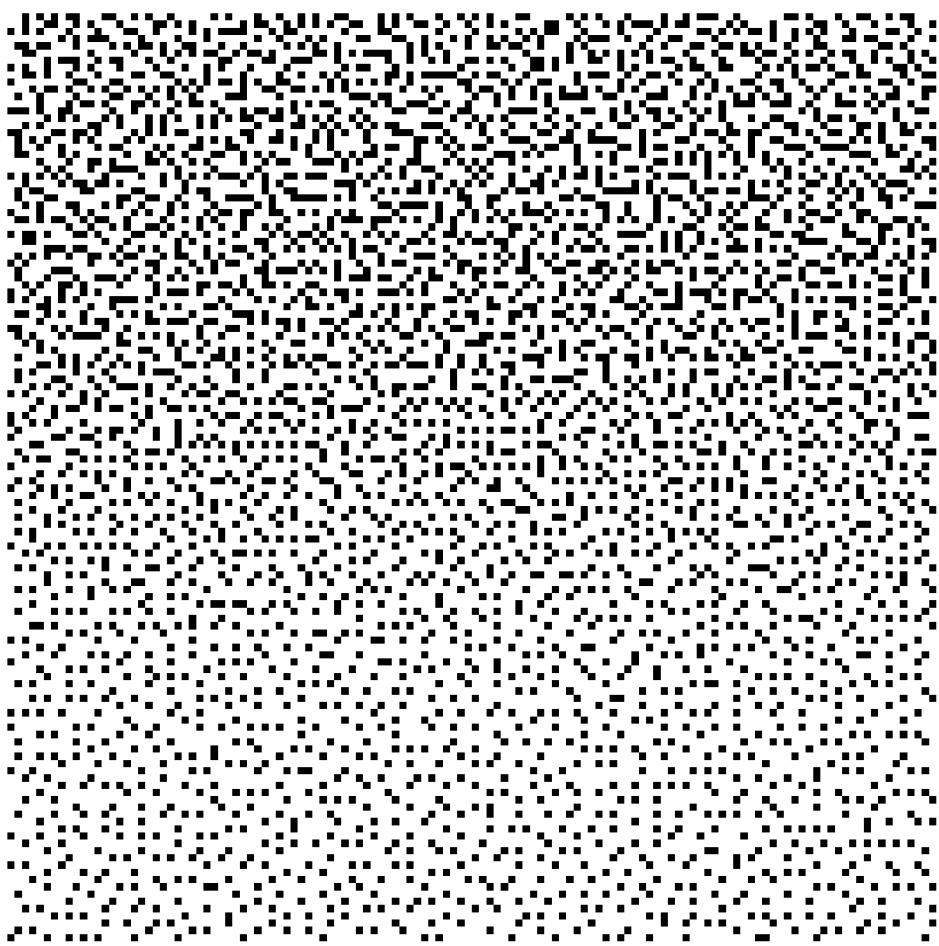
FIG. 17 is a view showing one example of a dot data at the first pass obtained by the pass division/binarization process in the fifth embodiment of the present invention.

FIG. 17 is a diagram showing one example of the dot data for the first pass described above. This example is the dot data showing the result of the pass division and binarization for the gradation printing by using the dither pattern shown in FIG. 9, performed for 8-bit solid image of each pixel of 50% density (pixel value of 128). This corresponds to dot data B shown in FIG. 7.

Figure 18:
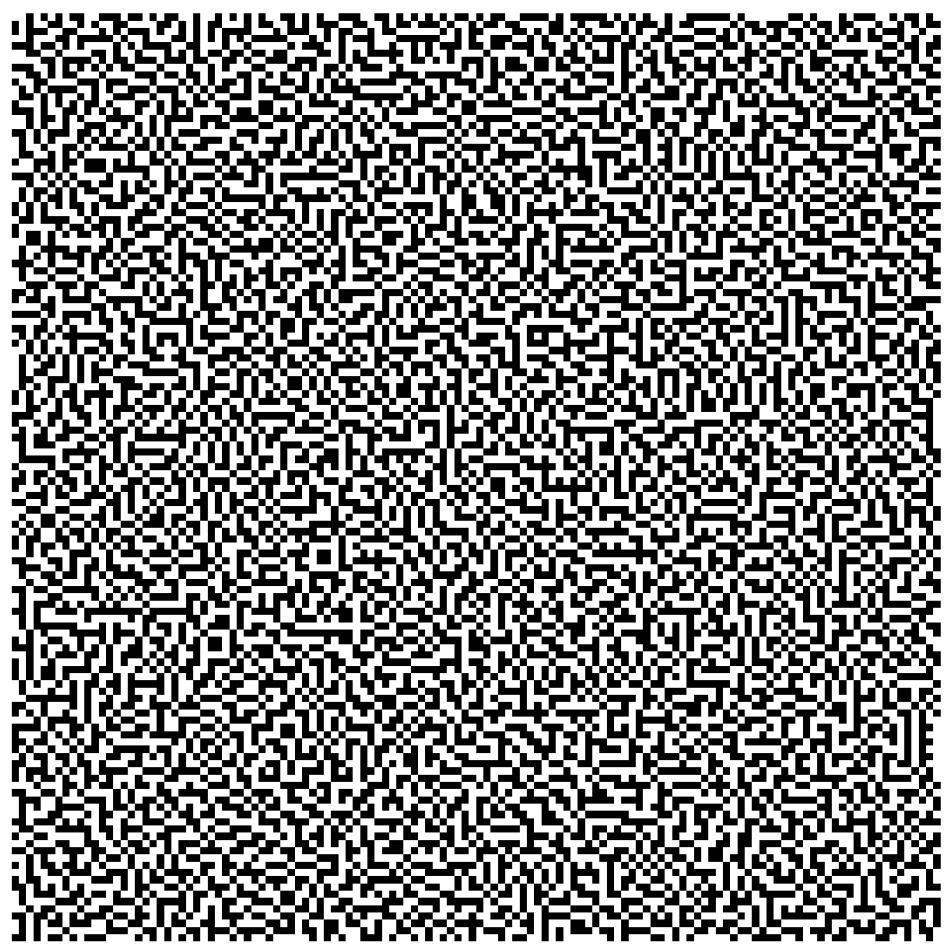
FIG. 18 is a view showing the result obtained by binarizing image data as it is by the dither pattern shown in FIG. 9 in the fifth embodiment.
Figure 19:
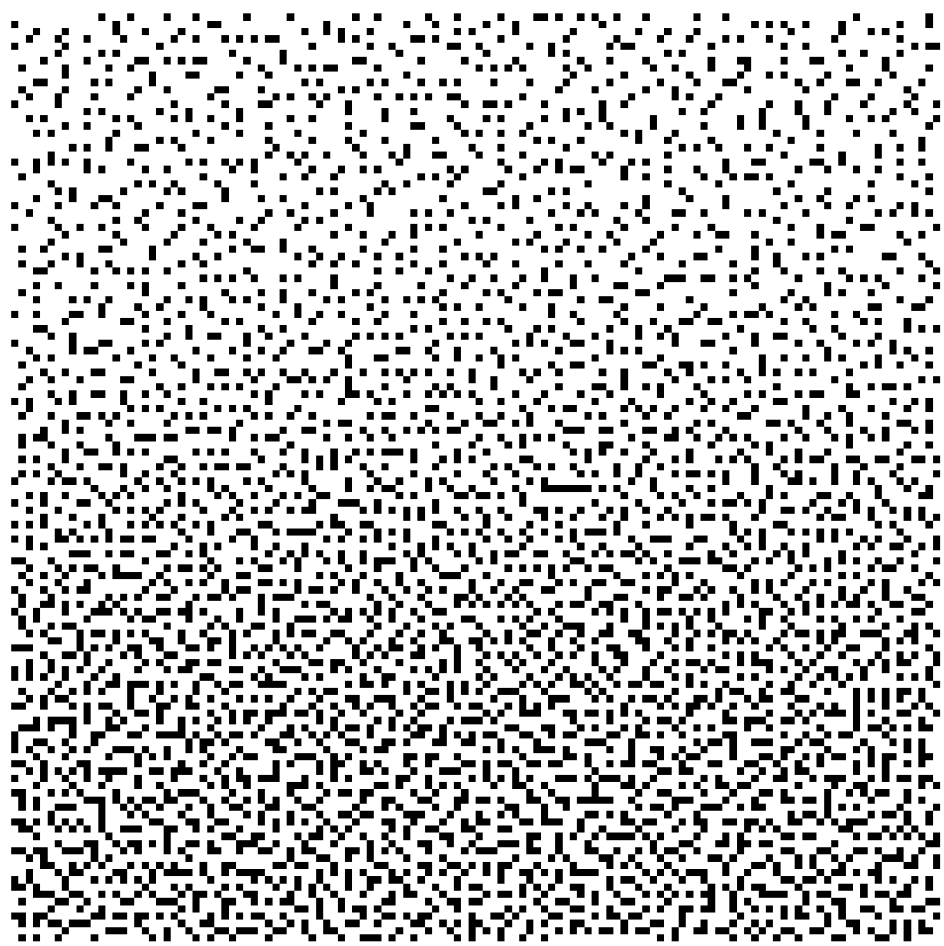
FIG. 19 is a view showing dot data at the second pass as the result obtained by subtracting the dot data shown in FIG. 17 from the dot data shown in FIG. 18.

FIG. 18 corresponds to dot data A shown in FIG. 13 and shows the image data produced by multiplying each raster by the printing ratio of 1, that is, a result of binarizing the image data as it is, with use of the dither pattern shown in FIG. 9. Then, FIG. 19 shows the dot data for the second pass as a result obtained by subtracting the dot data shown in FIG. 17 from the dot data shown in FIG. 18. That is, FIG. 19 shows a logical product of the image data in FIG. 18 and a negative of the dot data in FIG. 17. It is apparent from FIGS. 17 to 19 that the dot data at the first and second passes as a divided intermediate image or the dot data as a final image can have the dot arrangement with aperiodic and no low frequency component, except for the basic gradation component.

(Sixth Embodiment)

A sixth embodiment of the present invention relates to dot data generation for gradation printing through a multi-pass printing of four passes.

Figure 20:
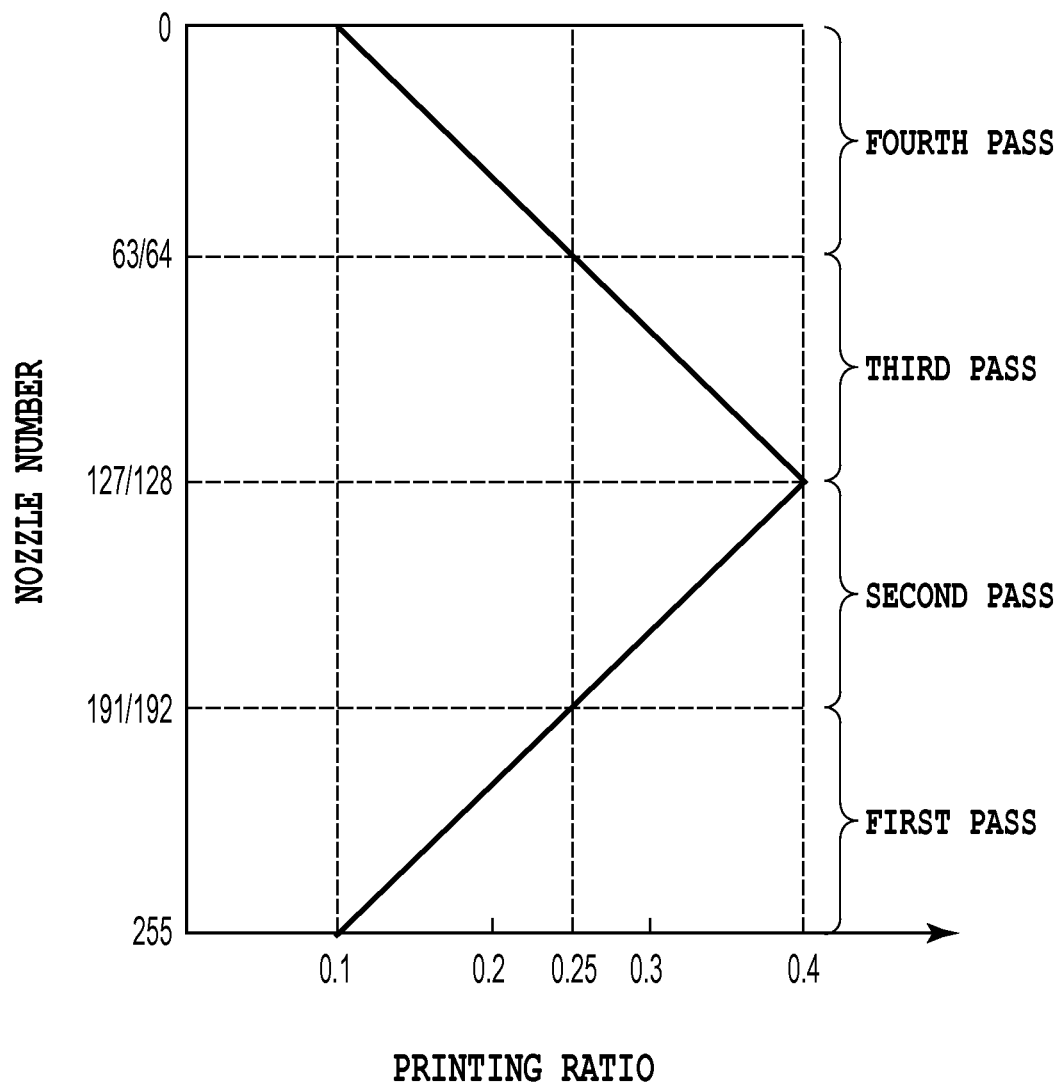
FIG. 20 is a diagram showing one example of a printing ratio corresponding to a nozzle arrangement in a sixth embodiment of the present invention.

FIG. 20 is a diagram showing one example of printing ratios corresponding to a nozzle arrangement. In the example shown in this figure, among 256 nozzles, nozzles of the numbers 192 to 255 are used for printing at a first pass. Hereinafter, similarly nozzles of the numbers 128 to 191 are used for printing at a second pass, nozzles of the numbers 64 to 127 are used for printing at a third pass and nozzles of the numbers 0 to 63 are used for printing at a fourth pass. In addition, the printing ratios of raster corresponding to nozzles of the numbers 192 to 255 is from 0.1 to 0.25, the printing ratios of raster corresponding to nozzles of the numbers 128 to 191 is from 0.25 to 0.4, the printing ratios of the raster corresponding to nozzles of the numbers 64 to 127 is from 0.25 to 0.4 and the printing ratios of the raster corresponding to nozzles of the numbers 0 to 63 is from 0.1 to 0.25.

The pass division and binarization in the present embodiment in the above condition will be explained with reference to FIG. 14. In place of a ratio of 1/4 shown in FIG. 14, the printing ratios of 0.1 to 0.25 are used in accordance with the raster. Hereinafter, as in the case of the fifth embodiment, in place of a ratio of 2/4, the printing ratios ((0.1+0.25) to (0.25+0.4)) are used, and in place of a ratio of 3/4, the printing ratios ((0.1+0.25+0.4) to (0.25+0.4+0.25)) are used. In addition, in place of a ratio of 4/4, the printing ratios ((0.1+0.25+0.4+0.25) to (0.25+0.4+0.25+0.1)) are used. That is, the printing ratio of 1 is used for all the raster. The other is the same as the processing explained in FIG. 14.

In addition, as a further example, pass division/binarization processing in a case of directly binarizing 8-bit 256 valued data, that is, in a case of using the dither pattern shown in FIG. 9 will be described with reference to FIG. 15 as follows. Also in this case, in place of a ratio of 1/4 shown in FIG. 15, the printing ratios of 0.1 to 0.25 are used in accordance with the raster. Hereinafter, as in the case of the fifth embodiment, in place of a ratio of 2/4, the printing ratios ((0.1+0.25) to (0.25+0.4)) are used, and in place of a ratio of 3/4, the printing ratios ((0.1+0.25+0.4) to (0.25+0.4+0.25)) are used. In addition, in place of a ratio of 4/4, the printing ratios ((0.1+0.25+0.4+0.25) to (0.25+0.4+0.25+0.1)) are used. That is, the printing ratio of 1 is used for all the raster. The other is the same as the processing explained in FIG. 15. Also in this case, although the above description is made by using the dither pattern of 4 pixels×4 pixels and ratios for raster r1, r2, r3, r4 being 0.7, 0.56, 0.43, 0.3 for simplification of description, actually the dither pattern shown in FIG. 9 and the printing ratios shown in FIG. 20 are used.

(Seventh Embodiment)

In the embodiments described above, dot data for an object pass is obtained by subtracting dot data for a pass previously subjected to the processing from dot data in which dot arrangements are cumulatively reflected. Specifically, a logical product of the dot data in which dot arrangements are reflected and a negative of the dot data previously obtained is performed to obtain the dot data for the object pass. In contrast, a seventh embodiment of the present invention processes threshold values in a dither pattern so as to omit the above calculation of the logical product.

Figure 21:
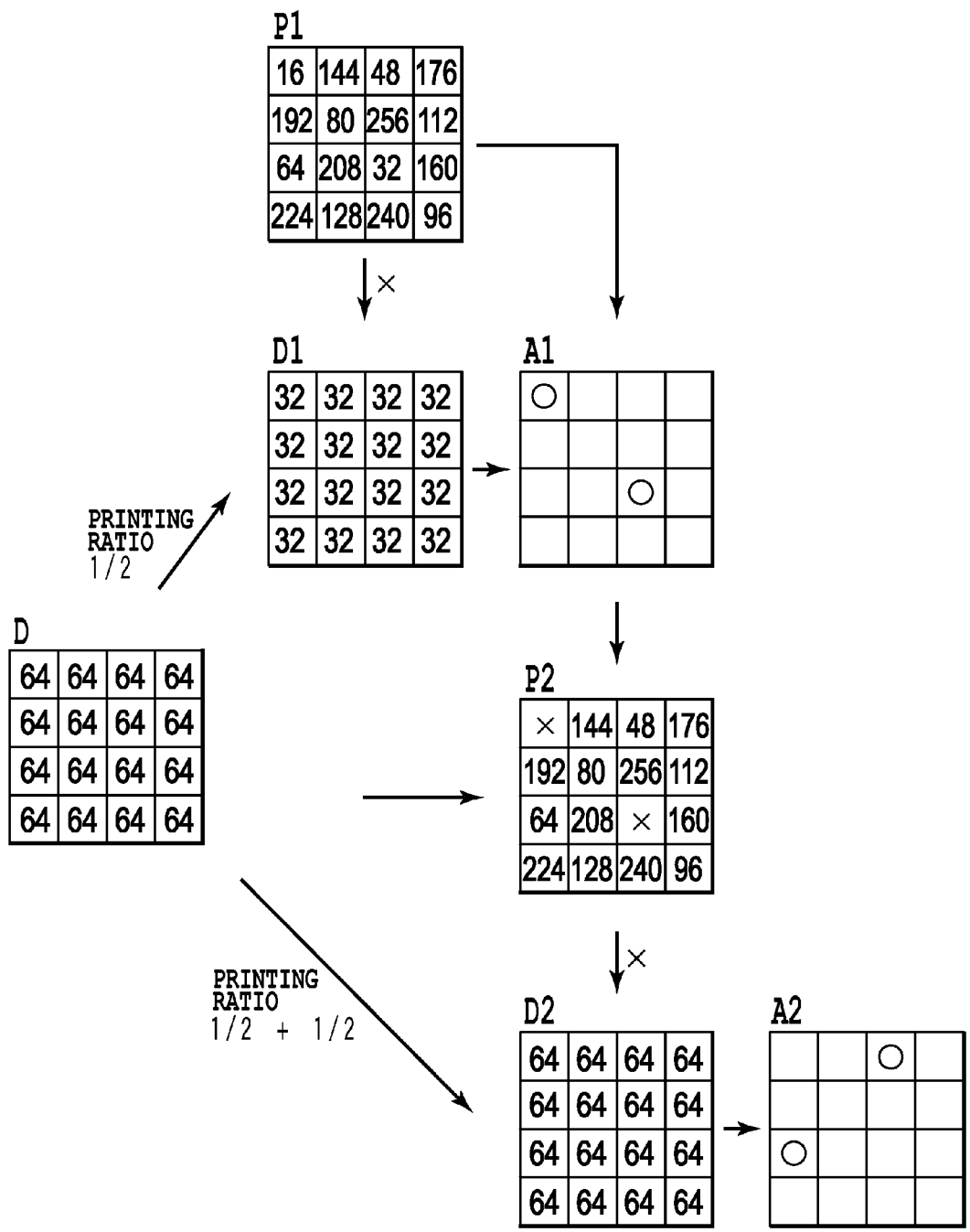
FIG. 21 is a diagram for explaining a pass division/binarization process according to a fourth embodiment of the present invention.

FIG. 21 is a diagram for illustrating pass division/binarization processing according to the present embodiment, and shows a case where image data D has value of 64 of 8-bit. In FIG. 21, P1 and P2 denote dither patterns respectively. Although in the actual dither pattern, 256 threshold values of "1" to "256" are arranged in the pattern as shown in FIG. 9, a shown example is that 16 threshold values are arranged in 4 pixels×4 pixels of the pattern for simplification of the description.

First, similarly to the above described embodiments, according to the pass division for two pass, the image data D is multiplied by a division ratio of 1/2 and thus divided image data D1 is obtained. In the shown example, each pixel value is made 32. Then, binarization, in which each pixel value of the image data D1 is compared with corresponding threshold value in the dither pattern P1, is performed to determine dot data A1 for a first pass. As shown in FIG. 21, data in which "1" (circle sign) is arranged in pixels corresponding to the threshold values "16" and "32" in the dither pattern P1.

Next, calculation based on comparison between the dither pattern P1 and the dot data A1 is performed. Specifically, the threshold values in the dither pattern P1 corresponding to pixels in each of which "1" (circle sign) is arranged are erased. In the shown example, the threshold values "16" and "32" are erased. As a result of this comparison calculation between the dither pattern P1 and the dot data A1, a dither pattern P2 is obtained.

Next, similarly to the above described embodiments, the image data D is multiplied by a printing ratio of (1/2+1/2) and thus divided image data D2 for a second pass is obtained. In the shown example, each pixel value is made 64. Then, binarization, in which the image data D2 is compared with threshold values in the dither pattern P2 obtained as described above, is performed to obtain dot data A2 for the second pass.

Here, a condition in which a threshold value has been erased is that "1" (circle sign) is not arranged in a pixel in the image data, which corresponds to a place of which a threshold value has been erased, in the binarization using the dither pattern of the above condition. In other words, in a relation between the threshold value and the pixel value, the threshold values "16" and "32" set to be infinite value (specifically, value having offset 256) and thus the result of binarization becomes "0" (no dot is printed) for any pixel value of 8-bit data in generation of data for the second pass described above. As additional description, the first to sixth embodiments performs the pass division/binarization processing in an opposite relation between the threshold value and the pixel value to the present embodiment. Specifically, the pixel value is made have a value according to adding up division ratios or printing ratios for each pass and thus increases relative magnitude to the threshold value. As a result of this, a dot arrangement for each pass is cumulatively determined.

Here, a condition in which a threshold value has been erased is that "1" (circle sign) is not arranged in a pixel in the image data, which corresponds to a place of which a threshold value has been erased, in the binarization using the dither pattern of the above condition. In other words, in a relation between the threshold value and the pixel value, the threshold values "16" and "32" are set to be infinite value (specifically, value having offset 256) and thus the result of binarization becomes "0" (no dot is printed) for any pixel value of 8-bit data in generation of data for the second pass described above. As additional description, the first to sixth embodiments perform the pass division/binarization processing in an opposite relation between the threshold value and the pixel value to the present embodiment. Specifically, the pixel value is made to have a value according to adding up division ratios or printing ratios for each pass and thus increases relative magnitude to the threshold value. As a result of this, a dot arrangement for each pass is cumulatively determined.

Further, similarly to each of the above described embodiments, in the case that threshold values in a dither pattern is dispersed with respect to the order of magnitudes of the threshold values, a result of the dither processing using this dither pattern for divided image data obtained by multiplying a division ratio is made be dot data in which a dot arrangement is dispersed according to the dispersion with respect to the order of the magnitudes. As a result, finally obtained dot data for each pass is not only dispersed in a plane of the pass but also is dispersed between respective dot data for respective passes.

In addition, as modification of the seventh embodiment, there is an example in which each threshold value in a dither pattern is related to one of passes for division. In the example of tow passes shown in FIG. 21, preliminarily, the threshold value "16" is related to a first pass, the threshold value "32" is related to a second pass, - - - , the threshold value "240" is related to the first pass, and the threshold value "256" is related to the second pass, in the dither pattern P1.

Then, processing according to the present embodiment "erases" the threshold values "32", "64", - - - , and "256" related to the second pass similarly to the above, first for generation of dot data for the first pass. Next, the dither pattern in which the threshold values related to the second pass have been erased is directly applied to image data D having threshold values of 64 to perform binarization. This allows the generated dot data to have dot arrangement in which "1" (circle sign) is arranged in respective pixels corresponding to the threshold values of "16" and "48". Further, the threshold values "16", "48", - - - , and "240" related to the first pass are "erased" similarly to the above for generation of dot data for the second pass. Then, the dither pattern in which the threshold values related to the first pass have been erased is directly applied to image data D having threshold values of 64 to perform binarization. This allows the generated dot data to have dot arrangement in which "1" (circle sign) is arranged in respective pixels corresponding to the threshold values of "32" and "64".

As described above, according to the present modified example, a processing load of the pass division/binarization can be further reduced. In addition, threshold values are related to a first, a second, - - - , in ascending order, so that a dispersion of a dot arrangement for one pass or between passes can be adequately determined in accordance with a dispersion characteristic of the order of relating threshold values to passes. For example, when printing dots is disproportionately performed in certain pass (e.g. first pass), the threshold values "16"-"208" are related to the first pass and the threshold values "224"-"256" are related to second pass.

(Other Embodiment)

The above described examples show examples of performing division-into-two or division-into-four in a case of a two-pass printing or a four-pass printing, respectively, but the present invention is not limited to these examples, needless to say. In a case of N-pass printing where a multi-pass printing completes an image by N times of scans, the division-into-N is generally made. On this occasion, the ratio of each pass for division or the printing ratio is set to the same printing ratio regardless of the raster in a case of an even printing shown in the first and second embodiments and the print ratios is added for each pass. The division ratio can be obtained by thus adding the printing ratios. However, the division ratio at the first pass is equal to the printing ratio. In addition, in a case of the gradation printing shown in the third and fourth embodiments, the printing ratio in accordance with the gradation is set for each raster and the set printing ratio is added for each pass.

In addition, the aforementioned example shows examples of multiplying the image data by the division ratio, but the present invention is not limited to this. In reverse, each threshold value of the dither pattern may be multiplied by the inverse number of the division ratio or the addition thereof for each pass.

Further, in the above embodiments, a printer driver operated in a personal computer carries out the pass division and the binarization particularly at step S305 among the processing in FIG. 5, but the present invention is not limited to this without mentioning. For example, the data division may be carried out by ASIC or hardware in an image printing apparatus (printer 104 in FIG. 4). For example, exclusive ASIC for executing the image processing in FIG. 5 may be provided within the printer 104 executing a series of processes in the image processing to carry out data generation by using the ASIC through control of CPU in the printer. In this case, the printer is to serve as an image processing apparatus (image data generating apparatus) for executing the image processing (pass division and dither processing) characterizing the present invention.

Further, the above embodiments explain examples of a multi-pass printing using C, M and Y ink, but it is apparent that the present invention may be applied to dot data generation in plural planes in accordance with the number of scan times in a multi-pass printing in a case of using one color ink.

In addition, it is also apparent that the present invention may be applied to data generation in a case of completing an image by executing a multi-pass printing in such a manner as to carry out the printing by reciprocation of the same print head in a unit area or without changing the corresponding nozzle.

Further, the present invention is not limited to a case of completing an image by plural times of print operations by a so-called serial type of printing apparatus such as each embodiment described above or by plural times of scans. For example, the present invention may be applied to a case of carrying out dot data generation of the division image in a case of completing the image by printing the division image with each of plural times of print operations by a so-called full line type of printing apparatus.

According to each of the embodiments described above, since it is permitted that ink permeation is not sufficiently made in a stage of an intermediate image as a result, it is possible to reduce the printing time difference between respective planes, that is, the discharge time difference. For example, it is possible to carry out the print where the carriage speed or the discharge frequency can be increased Further, it is possible to carry out the print where the pass number in the multi-pass printing can be reduced, for example, the pass number is reduced from the four-pass to be set in consideration that the ink is sufficiently permeated to the two-pass It should be noted that the construction similar to the above may be also applied to a printing system using a reaction-based ink or the like where ink and non-colored, transparent liquid or ink are mixed with each other to generate an insoluble substance. That is, pass division and binarization similar to the above are carried out for a plane of a binary data in a reaction-based ink or liquid, thereby making it possible to create the dot distribution where plural planes are overlapped to have a small number of low frequency components and good dispersing properties. This causes the odds that in a stage of an intermediate image, for example, neighboring ink the permeation of which is not sufficient unnecessarily reacts with each other to produce a lump of the insoluble substances to be small, and such lump can be made indistinctive even if it is produced.

The present invention is put into practice by program codes of software such as step S305 shown in FIG. 5 or storage medium storing the program codes, for example. They are supplied to a computer in an apparatus or a system connected to various devices to operate these devices so as to implement the functions of the above described embodiments, so that the various devices are operated in accordance with the programs stored in the computer (CPU or MPU) of the system or apparatus. In this case, the program codes of the software themselves implement the functions of the above described embodiments, so that the program codes themselves and means for supplying them to the computer, for example, a storage medium storing such program codes constitute the present invention.

The storage medium storing such program codes may be, for example, a floppy disk, a hard disk, an optical disk, a magneto-optical disk, a CD-ROM, a magnetic tape, a non-volatile memory card, or a ROM.

In addition, if the functions of the above described embodiments are implemented not only by the computer by executing the supplied program codes but also through cooperation between the program codes and an OS (Operating System) running in the computer, another application software, or the like, then these program codes are of course embraced in the embodiments of the present invention.

Furthermore, a case is of course embraced in the present invention, where after the supplied program codes have been stored in a memory provided in an expanded board in the computer or an expanded unit connected to the computer, a CPU or the like provided in the expanded board or expanded unit executes part or all of the actual process based on instructions in the program codes, thereby implementing the functions of the above described embodiments.

This application claims the benefit of Japanese Patent Application No. 2006-341389, filed Dec. 19, 2006, which is hereby incorporated by reference herein in its entirety.

The invention claimed is:

1. An image processing apparatus that generates dot data of an image to be printed on a unit area of a print medium by a plurality of printing operations that completes the image on the unit area, said apparatus comprising:
   a gradation data obtaining unit configured to obtain first data having a gradation value of a first proportion to a gradation value of the image data corresponding to a pixel of the image for one printing operation of the plurality of printing operations, and second data having a gradation value of a second proportion to a gradation value of the image data corresponding to a pixel of the image for another printing operation of the plurality of printing operations;
   a first dot data generation unit configured to generate first dot data defining dot formation on a pixel of the unit area by the one printing operation, by binarizing the first data using a dither matrix that defines gradation values as threshold values for determining whether or not to form the dot; and
   a second dot data generation unit configured to generate second dot data defining dot formation on a pixel of the unit area by the other printing operation, by binarizing the second data using a dither matrix that defines gradation values as threshold values for determining whether or not to form the dot with excluding dot forming on the pixel on which dot formation is defined in the first dot data using the first dot data.

2. An image processing apparatus as claimed in claim 1, wherein the gradation value of the second data is greater than the gradation value of the first data, and said second dot data generation unit generates the second dot data by subtracting the first dot data from dot data obtained by binarizing the second data using the dither matrix used for generation of the first dot data.

3. An image processing apparatus as claimed in claim 1, wherein said second dot data generation unit changes the dither matrix used for generation of the first dot data not to generate dot data of a pixel for which dot data has been generated by said first dot data generation unit and generates the second dot data by binarizing the second data using the changed dither matrix.

4. An image processing apparatus as claimed in claim 1, wherein the one and the other printing operations are respectively one and another scans of a print head over the unit area with ejecting ink to the print medium for printing.

5. An image processing apparatus as claimed in claim 1, wherein the one and the other printing operations are respectively printing by one and another print head ejecting ink to the print medium.

6. A non-transitory, computer-readable storage medium that includes a program which causes the computer to function as an image processing apparatus as claimed in claim 1.

7. An image processing method that generates dot data of an image to be printed on a unit area of a print medium by a plurality of printing operations that completes the image on the unit area, said method comprising the steps of:

obtaining first data having a gradation value of a first proportion to a gradation value of the image data corresponding to a pixel of the image for one printing operation of the plurality of printing operations, and second data having a gradation value of a second proportion to a gradation value of the image data corresponding to a pixel of the image for another printing operation of the plurality of printing operations;

generating first dot data defining dot formation on a pixel of the unit area by the one printing operation, by binarizing the first data using a dither matrix that defines gradation values as threshold values for determining whether or not to form the dot; and generating second dot data defining dot formation on a pixel of the unit area by the other printing operation, by binarizing the second data using a dither matrix that defines gradation values as threshold values for determining whether or not to form the dot with excluding dot forming on the pixel on which dot formation is defined in the first dot data using the first dot data.

8. An image processing method as claimed in claim 7, wherein the gradation value of the second data is greater than the gradation value of the first data, and said second dot data generating step generates the second dot data by subtracting the first dot data from dot data obtained by binarizing the second data using the dither matrix used for generation of the first dot data.

9. An image processing method as claimed in claim 7, wherein said second dot data generating step changes the dither matrix used for generation of the first dot data not to generate dot data of a pixel for which dot data has been generated by said first dot data generating step and generates the second dot data by binarizing the second data using the changed dither matrix.

10. An image processing method as claimed in claim 7, wherein the one and the other printing operations are respectively one and another scans of a print head over the unit area with ejecting ink to the print medium for printing.

11. An image processing method claimed in claim 7, wherein the one and the other printing operations are respectively printing by one and another print head ejecting ink to the print medium.

* * * * *